US012565760B2

(12) United States Patent
Amano et al.

(10) Patent No.: US 12,565,760 B2
(45) Date of Patent: Mar. 3, 2026

(54) WORK MACHINE

(71) Applicant: Hitachi Construction Machinery Co., Ltd., Tokyo (JP)

(72) Inventors: Hiroaki Amano, Tsukuba (JP); Kento Kumagai, Ami-machi (JP); Hiroto Oohira, Kasumigaura (JP); Shinji Nishikawa, Kasumigaura (JP); Akihiro Narazaki, Tsukuba (JP); Katsuaki Kodaka, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 163 days.

(21) Appl. No.: 18/281,983

(22) PCT Filed: Mar. 18, 2021

(86) PCT No.: PCT/JP2021/011261

§ 371 (c)(1),
(2) Date: Sep. 14, 2023

(87) PCT Pub. No.: WO2022/195832

PCT Pub. Date: Sep. 22, 2022

(65) Prior Publication Data

US 2024/0301661 A1 Sep. 12, 2024

(51) Int. Cl.
*E02F 9/22* (2006.01)
*F15B 11/16* (2006.01)

(52) U.S. Cl.
CPC ........... *E02F 9/2285* (2013.01); *F15B 11/165* (2013.01); *F15B 2211/20523* (2013.01);
(Continued)

(58) Field of Classification Search
None
See application file for complete search history.

(56) References Cited

U.S. PATENT DOCUMENTS

| | | | |
|---|---|---|---|
| 7,155,909 B2 * | 1/2007 | Toji | E02F 9/2285 60/468 |
| 7,168,246 B2 * | 1/2007 | Toji | E02F 9/2282 60/494 |

(Continued)

FOREIGN PATENT DOCUMENTS

| | | |
|---|---|---|
| JP | 4-12498 U | 1/1992 |
| JP | 2001-263304 A | 9/2001 |

(Continued)

OTHER PUBLICATIONS

International Preliminary Report on Patentability (PCT/IB/338 & PCT/IB/373) issued in PCT Application No. PCT/JP2021/011261 dated Sep. 28, 2023, including English translation of Written Opinion (PCT/ISA/237) (7 pages).

International Search Report (PCT/ISA/210) issued in PCT Application No. PCT/JP2021/011261 dated May 25, 2021 with English translation (5 pages).

(Continued)

*Primary Examiner* — Michael Quandt

(74) *Attorney, Agent, or Firm* — Crowell & Moring LLP

(57) ABSTRACT

A work machine includes: a main circuit that supplies a working fluid from a pump to an actuator; a pilot circuit that introduces part of the working fluid from the pump, to a pilot pressure receiving section of a control valve; a bleed-off passage that connects the pump and a tank. The pilot circuit is provided with: a first pressure reducing valve that generates a pilot primary pressure; and second and third pressure reducing valves that generate a pilot secondary pressure to be applied to the control valve and a bleed-off valve. A moving area of a spool of the bleed-off valve has a first moving area where an opening area of a restrictor changes stepwise, and a second moving area where the opening area of the restrictor changes continuously. A controller controls the third pressure reducing valve such that the spool is positioned in the first moving area at the time of non-operation of the actuator, and the spool is positioned in the second moving area at the time of operation of the actuator.

(Continued)

The restrictor of the bleed-off valve has a restricting hole that gives a resistance to the working fluid passing therethrough in a case the spool is positioned in the first moving area.

6 Claims, 17 Drawing Sheets

(52) U.S. Cl.
CPC ............... *F15B 2211/20546* (2013.01); *F15B 2211/3111* (2013.01); *F15B 2211/327* (2013.01); *F15B 2211/329* (2013.01); *F15B 2211/355* (2013.01); *F15B 2211/40515* (2013.01); *F15B 2211/41563* (2013.01); *F15B 2211/428* (2013.01); *F15B 2211/45* (2013.01); *F15B 2211/50536* (2013.01); *F15B 2211/50554* (2013.01); *F15B 2211/6346* (2013.01); *F15B 2211/6355* (2013.01); *F15B 2211/67* (2013.01)

(56) References Cited

U.S. PATENT DOCUMENTS

| | | | | |
|---|---|---|---|---|
| 9,249,812 | B2 * | 2/2016 | Jeon | F15B 11/165 |
| 10,273,659 | B2 * | 4/2019 | Kondo | E02F 9/2285 |
| 11,008,734 | B2 * | 5/2021 | Nakajima | E02F 9/2296 |
| 11,421,715 | B2 * | 8/2022 | Nakajima | E02F 9/2282 |
| 2004/0244232 | A1 | 12/2004 | Toji | |
| 2020/0308808 | A1 | 10/2020 | Nakajima | |

FOREIGN PATENT DOCUMENTS

| | | | |
|---|---|---|---|
| JP | 2004-360898 | A | 12/2004 |
| JP | 2012-2289 | A | 1/2012 |
| JP | 2019-94973 | A | 6/2019 |

OTHER PUBLICATIONS

Japanese-language Written Opinion (PCT/ISA/237) issued in PCT Application No. PCT/JP2021/011261 dated May 25, 2021 with English translation (9 pages).

* cited by examiner

C4

C12

WORK MACHINE

TECHNICAL FIELD

The present invention relates to a work machine.

BACKGROUND ART

There is a known work machine including: a main hydraulic fluid pressure circuit that controls a working fluid delivered from a main pump by using a pilot operated control valve, and supplies the working fluid to a fluid actuator; and a pilot-system fluid pressure circuit that supplies, as a pilot primary pressure, a hydraulic fluid the pressure of which is set at a pilot relief valve after being delivered from a pilot pump, to a solenoid proportional pressure reducing valve, and introduces a secondary pressure controlled at the solenoid proportional pressure reducing valve to the pilot operated control valve (see FIG. 6 in Patent Document 1). In such a work machine, even in a case where there is no manual operation by an operator, a hydraulic working fluid at a certain flow rate delivered from a pilot pump is relieved to a tank by a pilot relief valve, and accordingly there has been a problem that the energy consumption efficiency is lowered.

In order to ameliorate deterioration of the energy consumption efficiency caused by providing the pilot relief valve, Patent Document 1 proposes a fluid pressure circuit device having: the main hydraulic fluid pressure circuit that controls the working fluid delivered from the pump by using the pilot operated control valve to supply the working fluid to a fluid pressure actuator; and the pilot-system fluid pressure circuit that supplies part of the working fluid delivered from the pump in the main hydraulic fluid pressure circuit to a pilot acting section of the pilot operated control valve.

In this fluid pressure circuit device, a bypass sequence valve is provided on a bypass passage connecting the pump and a tank. The bypass sequence valve is controlled to be in a no-load communicating state when there are no manual operation signals, and is controlled such that the pressure at the inlet portion of the bypass sequence valve becomes a pressure which is equal to or greater than the pilot primary pressure when there is a manual operation signal.

PRIOR ART DOCUMENT

Patent Document

Patent Document 1: JP-2001-263304-A

SUMMARY OF THE INVENTION

Problem to be Solved by the Invention

Regarding a bleed-off valve (e.g. equivalent to the bypass sequence valve described in Patent Document 1) that discharges part of a working fluid delivered from a pump to a tank, thrust required to drive a valve body increases as the flow rate and pressure of the working fluid passing through the bleed-off valve increase. In this case, a pilot-driven bleed-off valve is adopted.

However, where a pilot-driven bleed-off valve is applied to the fluid pressure circuit device described in Patent Document 1, the bleed-off valve is controlled to be in the no-load communicating state to lower the circuit pressure when there are no manual operation signals, and accordingly there has been a problem that a pilot pressure for driving the bleed-off valve cannot be generated when a manual operation signal has been generated. Because of this, regarding a work machine including a pilot-driven bleed-off valve, there has been demand a work machine that can stably ensure a circuit pressure necessary for generation of a pilot primary pressure when operation is not being performed.

An object of the present invention is to provide a work machine including a pilot-driven bleed-off valve that can stably ensure a pressure of the main circuit necessary for generation of a pilot primary pressure when actuators are not being operated, for a work machine having a pilot circuit that introduces, to a control valve, part of a working fluid delivered from a pump to a main circuit.

Means for Solving the Problem

A work machine according to an aspect of the present invention includes: a main circuit that supplies a working fluid delivered from a pump to an actuator; a control valve that is provided in the main circuit, and controls a flow of the working fluid supplied from the pump to the actuator; a pilot circuit that introduces part of the working fluid delivered from the pump, to a pilot pressure receiving section of the control valve; a first pressure reducing valve that is provided in the pilot circuit, and reduces a pressure of the working fluid delivered from the pump to generate a pilot primary pressure; a second pressure reducing valve that is provided in the pilot circuit, and reduces the pilot primary pressure to generate a pilot secondary pressure acting on the pilot pressure receiving section of the control valve; a bleed-off passage that connects the pump and a tank; a pilot-driven bleed-off valve provided on the bleed-off passage; a third pressure reducing valve that is provided in the pilot circuit, and reduces the pilot primary pressure to generate the pilot secondary pressure acting on a pilot pressure receiving section of the bleed-off valve; an operation device for operating the actuator; and a controller that controls the third pressure reducing valve on a basis of operation by the operation device. The bleed-off valve has: a spool that is moved in an axial direction by the pilot secondary pressure generated by the third pressure reducing valve; a valve body that houses the spool slidably; and a restrictor that gives a resistance to the working fluid passing therethrough. A moving area of the spool in the axial direction has a first moving area where an opening area of the restrictor changes stepwise, and a second moving area where the opening area of the restrictor changes continuously. The controller is configured to control the third pressure reducing valve such that the spool is positioned in the first moving area in a case the actuator is not being operated by the operation device. The controller is configured to control the third pressure reducing valve such that the spool is positioned in the second moving area in a case the actuator is being operated by the operation device with an operation amount greater than a predetermined value set in advance. The restrictor has a restricting hole that gives a resistance to the working fluid passing therethrough in a case the spool is positioned in the first moving area.

Advantages of the Invention

The present invention makes it possible to stably ensure a pressure of a main circuit necessary for generation of a pilot primary pressure when actuators are not being operated.

MODES FOR CARRYING OUT THE INVENTION

With reference to the figures, a work machine according to an embodiment of the present invention is explained. In an example explained in the present embodiment, the work machine is a crawler type hydraulic excavator.

Figure 1:
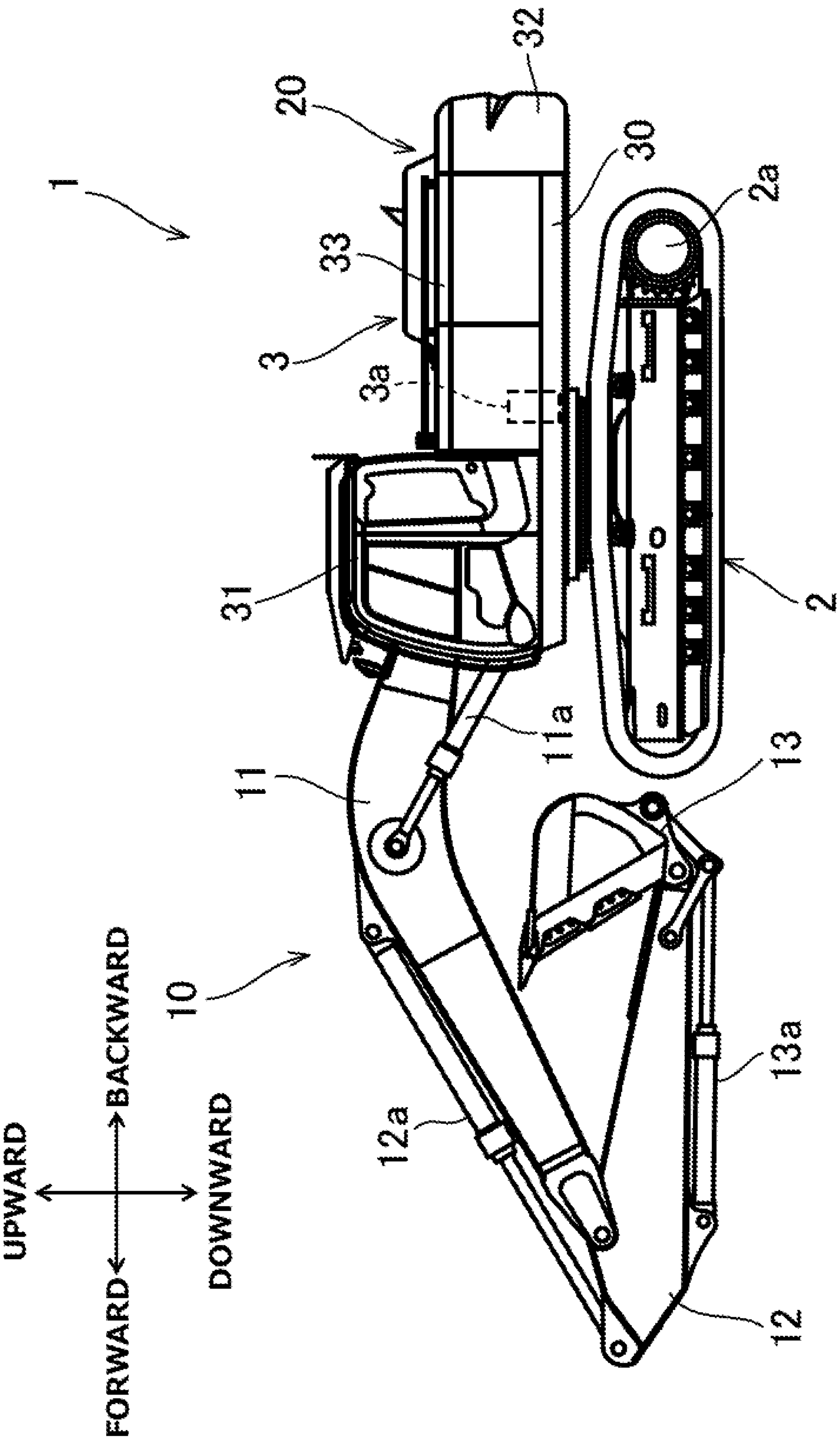
FIG. 1 is a side view of a hydraulic excavator according to an embodiment of the present invention.

FIG. 1 is a side view of a hydraulic excavator 1 according to an embodiment of the present invention. For convenience of explanation, the forward/backward direction and upward/downward direction of the hydraulic excavator 1 are specified as depicted in FIG. 1. That is, in the present embodiment, the front side of the operator's seat (the leftward direction in the figure) is treated as the front side of the hydraulic excavator 1, unless noted otherwise particularly.

The hydraulic excavator 1 includes a machine body (vehicle body) 20 and a work implement 10 attached to the machine body 20. The machine body 20 includes a travel structure 2 and a swing structure 3 mounted swingably on the travel structure 2. The travel structure 2 has a pair of left and right crawlers and a travel hydraulic motor 2*a*, which is an actuator. The travel structure 2 travels by the crawlers being driven by the travel hydraulic motor 2*a*. The swing structure 3 has a swing hydraulic motor 3*a*, which is an actuator. The swing structure 3 is rotated relative to the travel structure 2 by the swing hydraulic motor 3*a*.

The swing structure 3 has: a swing frame 30; an operation room 31 provided on the front left side of the swing frame 30; a counter weight 32 provided at the rear of the swing frame 30; and an engine compartment 33 provided behind the operation room 31 on the swing frame 30. The engine compartment 33 houses an engine, which is a motive power source, and hydraulic equipment such as a hydraulic pump, valves, and an accumulator. The work implement 10 is pivotably coupled to the front middle of the swing frame 30.

The work implement 10 is an articulated type work implement having a plurality of driven members pivotably coupled to each other and a plurality of hydraulic cylinders that drive the driven members. In the present embodiment, a boom 11, an arm 12, and a bucket 13 as three driven members are coupled in series. The base end of the boom 11 is pivotably coupled to the front of the swing frame 30. The base end of the arm 12 is pivotably coupled to the distal end of the boom 11. The bucket 13 is pivotably coupled to the distal end of the arm 12.

The boom 11 is driven by a hydraulic cylinder (hereinafter, written also as a boom cylinder 11*a*), which is an actuator, and pivots relative to the swing frame 30. The arm 12 is driven by a hydraulic cylinder (hereinafter, written also as an arm cylinder 12*a*), which is an actuator, and pivots relative to the boom 11. The bucket 13 is driven by a hydraulic cylinder (hereinafter, written also as a bucket cylinder 13*a*), which is an actuator, and pivots relative to the arm 12.

Figure 2:
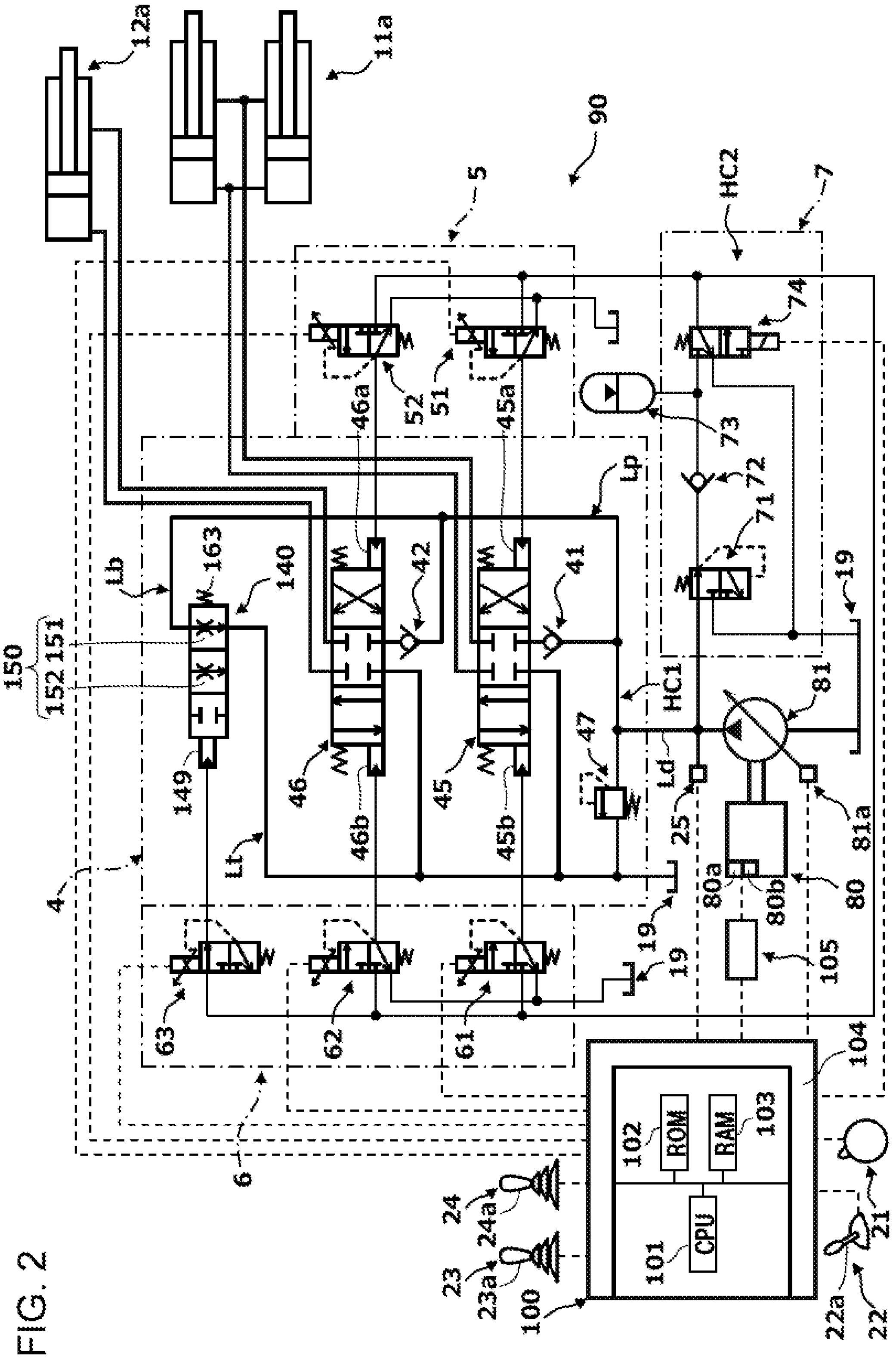
FIG. 2 is a figure depicting a hydraulic system mounted on the hydraulic excavator.

FIG. 2 is a figure depicting a hydraulic system 90 mounted on the hydraulic excavator 1. Note that the hydraulic system 90 is provided with hydraulic equipment for driving the plurality of hydraulic actuators (2*a*, 3*a*, 11*a*, 12*a*, and 13*a*), but only hydraulic equipment for driving the boom cylinder 11*a* and the arm cylinder 12*a* is depicted in FIG. 2, and hydraulic equipment for driving other hydraulic actuators (2*a*, 3*a*, and 13*a*) is omitted in the figure.

FIG. 2 also depicts a main controller 100, which is a controller that controls the hydraulic system 90, and devices (21, 22, 23, 24, and 25) that output signals to the main controller 100. As depicted in FIG. 2, the hydraulic excavator 1 includes: an engine control dial 21 for setting a target rotation speed of an engine 80; an operation device (written also as a boom operation device) 23 for operating the boom cylinder 11*a* (boom 11); an operation device (written also as an arm operation device) 24 for operating the arm cylinder 12*a* (arm 12); and a gate lock lever device 22. These devices (21 to 24) are provided in the operation room 31.

The boom operation device 23 has: an operation lever 23*a* that can be operated to incline from the neutral position to the boom-raising side and the boom-lowering side; and an operation sensor that senses an operation direction and an operation amount of the operation lever 23*a*, and outputs an operation signal representing the operation direction and the operation amount of the operation lever 23*a* to the main controller 100. The arm operation device 24 has: an operation lever 24*a* that can be operated to incline from the neutral position to the arm-crowding side and the arm-dumping side; and an operation sensor that senses an operation direction and an operation amount of the operation lever 24*a*, and outputs an operation signal representing the operation direction and the operation amount of the operation lever 24*a* to the main controller 100. Operation amounts (operation angles) of the operation levers 23*a* and 24*a* sensed at the operation sensors of the operation devices 23 and 24 are 0 [%] (0°) when the operation levers 23*a* and 24*a* are at the neutral positions, and their absolute values increase as their inclinations relative to the neutral positions increase.

The gate lock lever device 22 has a lever 22*a* that is selectively operated to a lock position (raised position) for permitting an operator to exit or enter the operation room 31 and also prohibiting actions of the actuators (11*a*, 12*a*, and 13*a*), and to an unlock position (lowered position) for prohibiting the operator to exit or enter the operation room 31 and also permitting actions of the actuators (11*a*, 12*a*, and 13*a*). In addition, the gate lock lever device 22 has an operation position sensor that senses an operation position of the lever 22*a*, and outputs a gate lock lever signal representing the operation position of the lever 22*a* to the main controller 100.

The engine control dial 21 is an operation device for setting a target rotation speed of the engine 80, and outputs an operation signal to the main controller 100. The main controller 100 determines a target rotation speed on the basis of the operation signal from the engine control dial 21, and outputs a signal of the determined target rotation speed to an engine controller 105. The engine 80 is provided with an engine rotation speed sensor 80*a* that senses an actual rotation speed of the engine 80, and a fuel injection device 80*b* that adjusts the injection quantity of a fuel to be injected into cylinders of the engine 80. The engine controller 105 controls the fuel injection device 80*b* such that the actual rotation speed of the engine 80 sensed at the engine rotation speed sensor 80*a* becomes the target rotation speed output from the main controller 100.

The hydraulic system 90 includes: a pump 81; a main circuit HC1 that supplies a hydraulic working fluid as a working fluid delivered from the pump 81, to the boom cylinder 11*a* and the arm cylinder 12*a*; a pilot circuit HC2 connected to the main circuit HC1; and a bleed-off passage Lb that connects the pump 81 with a tank 19 where the hydraulic working fluid is stored. The pilot circuit HC2 is a circuit that introduces part of the hydraulic working fluid delivered from the pump 81, to pilot pressure receiving sections 45*a*, 45*b*, 46*a*, and 46*b* of control valves 45 and 46 mentioned later, and to a pilot pressure receiving section 149 of a bleed-off valve 140 mentioned later.

The pump 81 is connected to the engine 80, and is driven by the engine 80 to suck in the hydraulic working fluid from the tank 19 and deliver the hydraulic working fluid. The pump 81 is a variable displacement piston hydraulic pump, and the delivery capacity (displacement volume) changes when a regulator 81*a* changes the tilting of the swash plate. The engine 80 is the motive power source of the hydraulic excavator 1, and includes an internal combustion engine such as a diesel engine.

The main circuit HC1 is provided with: the control valve (hereinafter, written also as a boom control valve) 45 that controls a flow of the hydraulic working fluid supplied from the pump 81 to the boom cylinder 11*a*; and the control valve (hereinafter, written also as an arm control valve) 46 that controls a flow of the hydraulic working fluid supplied from the pump 81 to the arm cylinder 12*a*.

The main circuit HC1 is provided with a relief valve 47 that specifies the maximum pressure of the pump delivery pressure (circuit pressure) by discharging, to a tank passage Lt, the hydraulic working fluid delivered from the pump 81, when the pump delivery pressure exceeds a set pressure set in advance.

The main circuit HC1 has: a pump delivery passage Ld connected to the delivery port of the pump 81; a parallel passage Lp connected to the pump delivery passage Ld; and the tank passage Lt connected to the tank 19.

The parallel passage Lp is a passage that introduces the hydraulic working fluid from the pump delivery passage Ld, to the pump ports of the boom control valve 45 and the arm control valve 46. The parallel passage Lp connected to the pump port of the boom control valve 45 is provided with a check valve 41 for maintaining the load pressure of the boom cylinder 11*a*. The check valve 41 is fully closed when the pump delivery pressure falls below the cylinder pressure. The parallel passage Lp connected to the pump port of the arm control valve 46 is provided with a check valve 42 for maintaining the load pressure of the arm cylinder 12*a*. The check valve 42 is fully closed when the pump delivery pressure falls below the cylinder pressure.

The bleed-off passage Lb is connected to the parallel passage Lp. The bleed-off passage Lb is provided with the pilot driven bleed-off valve 140. The bleed-off valve 140 has a restrictor (variable restrictor) 150 that gives a resistance to a flow of the passing hydraulic working fluid, and discharges the hydraulic working fluid delivered from the pump 81, to the tank 19 through the restrictor 150. The bleed-off valve 140 can adjust the pump delivery pressure by changing the opening area (opening) of the restrictor 150.

The pilot circuit HC2 is provided with: a pilot pressure reducing valve (first pressure reducing valve) 71 that reduces the pressure (i.e. the pump delivery pressure) of the hydraulic working fluid delivered from the pump 81 to generate a pilot primary pressure; a check valve 72 for maintaining the pilot primary pressure; an accumulator 73 for smoothing the pilot primary pressure; solenoid valves (second pressure reducing valves) 51 and 61 that reduce the pilot primary pressure to generate a pilot secondary pressure acting on the pilot pressure receiving sections 45*a* and 45*b* of the boom control valve 45; solenoid valves (second pressure reducing valves) 52 and 62 that reduce the pilot primary pressure to generate the pilot secondary pressure acting on the pilot pressure receiving sections 46*a* and 46*b* of the arm control valve 46; a solenoid valve (third pressure reducing valve) 63 that reduces the pilot primary pressure to generate the pilot secondary pressure acting on the pilot pressure receiving section 149 of the bleed-off valve 140; and a lock valve 74 that can interrupt the pilot primary pressure. The solenoid valves 51, 52, 61, 62, and 63 are solenoid proportional valves driven by solenoid thrust that is generated in accordance with control currents supplied to solenoids.

The solenoid valves 51 and 61 generate the pilot secondary pressure to be output to the pilot pressure receiving sections 45*a* and 45*b* of the boom control valve 45, by using the pilot primary pressure generated by the pilot pressure reducing valve 71 as the source pressure. The solenoid valves 51 and 61 are controlled on the basis of signals (control currents) output from the main controller 100. The main controller 100 controls the solenoid valves 51 and 61 on the basis of an operation signal output from the boom operation device 23.

When the pilot secondary pressure generated by the solenoid valve 51 acts on the pilot pressure receiving section 45*a* of the boom control valve 45, the boom control valve 45 is switched to the extension position. Thus, the hydraulic working fluid delivered from the pump 81 is introduced to the bottom chamber of the boom cylinder 11*a*, and also the hydraulic working fluid is discharged from the rod chamber to the tank 19 to make the boom cylinder 11*a* extend. As a result, the boom 11 pivots upward direction (i.e. the boom 11 stands up).

When the pilot secondary pressure generated by the solenoid valve 61 acts on the pilot pressure receiving section 45*b* of the boom control valve 45, the boom control valve 45 is switched to the contraction position. Thus, the hydraulic working fluid delivered from the pump 81 is introduced to the rod chamber of the boom cylinder 11*a*, and also the hydraulic working fluid is discharged from the bottom chamber to the tank 19 to make the boom cylinder 11*a* contract. As a result, the boom 11 pivots downward direction (i.e. the boom 11 lies down).

The solenoid valves 52 and 62 generate the pilot secondary pressure to be output to the pilot pressure receiving sections 46*a* and 46*b* of the arm control valve 46, by using the pilot primary pressure generated by the pilot pressure reducing valve 71 as the source pressure. The solenoid valves 52 and 62 are controlled on the basis of signals (control currents) output from the main controller 100. The main controller 100 controls the solenoid valves 52 and 62 on the basis of an operation signal output from the arm operation device 24.

When the pilot secondary pressure generated by the solenoid valve 52 acts on the pilot pressure receiving section 46*a* of the arm control valve 46, the arm control valve 46 is switched to the extension position. Thus, the hydraulic working fluid delivered from the pump 81 is introduced to the bottom chamber of the arm cylinder 12*a*, and also the hydraulic working fluid is discharged from the rod chamber to the tank 19 to make the arm cylinder 12*a* extend. As a result, the arm 12 pivots downward direction (i.e. the arm 12 performs a crowding action).

When the pilot secondary pressure generated by the solenoid valve 62 acts on the pilot pressure receiving section 46*b* of the arm control valve 46, the arm control valve 46 is switched to the contraction position. Thus, the hydraulic working fluid delivered from the pump 81 is introduced to the rod chamber of the arm cylinder 12*a*, and also the hydraulic working fluid is discharged from the bottom chamber to the tank 19 to make the arm cylinder 12*a* contract. As a result, the arm 12 pivots upward direction (i.e. the arm 12 performs a dumping action).

The solenoid valve 63 generates the pilot secondary pressure to be output to the pilot pressure receiving section 149 of the bleed-off valve 140, by using the pilot primary pressure generated by the pilot pressure reducing valve 71 as the source pressure. The solenoid valve 63 is controlled on the basis of a signal (control current) output from the main controller 100. The main controller 100 controls the solenoid valve 63 on the basis of a gate lock lever signal output from the gate lock lever device 22 and operation signals output from the operation devices 23 and 24.

The position of a spool 141 (see FIG. 3) of the bleed-off valve 140 is controlled in accordance with the pilot secondary pressure acting on the pilot pressure receiving section 149. Where the magnitude of the pilot secondary pressure is equivalent to the tank pressure, the spool 141 is maintained at the neutral position by the spring force of a return spring 163. At this time, the opening area of the restrictor 150 is a maximum opening area Amax.

When the pilot secondary pressure acting on the pilot pressure receiving section 149 increases, the spool 141 moves against the spring force of the return spring 163, and the opening area of the restrictor 150 decreases. When the pilot secondary pressure acting on the pilot pressure receiving section 149 increases further, and the spool 141 moves to the interruption position, the bleed-off valve 140 interrupts communication between the pump 81 and the tank 19. At this time, the opening area of the restrictor 150 is a minimum opening area Amin (e.g. 0). Details of the structure and control content of the bleed-off valve 140 are mentioned later.

The lock valve 74 is provided between the pilot pressure reducing valve 71 and the solenoid valves 51, 52, 61, 62, and 63. The lock valve 74 is a solenoid selector valve that is switched to either the interruption position or the communication position in accordance with a control signal output from the main controller 100 depending on the operation position of the gate lock lever device 22.

When the gate lock lever device 22 is operated to the lock position, the lock valve 74 is switched to the interruption position. Thus, the pilot primary pressure to be applied to the solenoid valves 51, 52, 61, and 62 is interrupted, and operation by the operation levers 23*a* and 24*a* is disabled. In addition, since the pilot primary pressure to be applied to the solenoid valve 63 also is interrupted, the bleed-off valve 140 is maintained at the neutral position independently of operation by the operation devices 23 and 24.

When the gate lock lever device 22 is operated to the unlock position, the lock valve 74 is switched to the communication position. Because of this, in a state where the gate lock lever device 22 is operated to the unlock position, the pilot secondary pressure according to the operation directions and operation amounts of the operation levers 23*a* and 24*a* is generated by the solenoid valves 51, 52, 61, and 62, and the actuator (11*a*, 12*a*) corresponding to the operated operation lever 23*a* or 24*a* is actuated.

Note that since the pilot circuit HC2 is provided with the check valve 72 and the accumulator 73 as mentioned above, it becomes possible to maintain the pilot primary pressure even where the delivery pressure of the pump 81 temporarily becomes lower than a set pressure of the pilot pressure reducing valve 71.

The main controller 100 is configured from a microcomputer including a CPU (Central Processing Unit) 101 as an actuation circuit, a ROM (Read Only Memory) 102 as a storage device, a RAM (Random Access Memory) 103 as a storage device, an input/output interface 104, and other peripheral circuits. The main controller 100 may be configured from one microcomputer or may be configured from a plurality of microcomputers. The engine controller 105 also has configuration similar to that of the main controller 100, and is connected to the main controller 100 to exchange information (data) therebetween.

The ROM 102 is a non-volatile memory such as an EEPROM, and has stored thereon programs that can execute various types of computation. That is, the ROM 102 is a storage medium that can read programs to realize functions of the present embodiment. The RAM 103 is a volatile memory, and is a work memory that outputs/receives data directly to/from the CPU 101. The RAM 103 temporarily stores necessary data while the CPU 101 is executing computations of the programs. Note that the main controller 100 may further include a storage device such as a flash memory or a hard disk drive.

The CPU 101 is a processing device that loads the programs stored on the ROM 102 onto the RAM 103 to execute computations of the programs, and performs predetermined computation processes on signals taken in from the input/output interface 104, the ROM 102, and the RAM 103 in accordance with the programs. Signals from the engine control dial 21, the gate lock lever device 22, the operation devices 23 and 24, a pressure sensor 25, the engine controller 105, and the like are input to the input/output interface 104. An input section of the input/output interface 104 converts the input signals into a format in which the CPU 101 can perform computations. In addition, an output section of the input/output interface 104 generates signals for output according to results of computation at the CPU 101, and outputs the signals to the lock valve 74, the solenoid valves 51, 52, 61, 62, and 63, the regulator 81*a*, and the like.

The pressure sensor 25 senses the pump delivery pressure (the circuit pressure of the main circuit HC1), and outputs a signal representing a sensing result (pump delivery pressure) to the main controller 100. The main controller 100 controls the delivery capacity of the pump 81 by using the regulator 81*a* on the basis of a pump delivery pressure and an actual engine rotation speed sensed by the sensors 25 and 80*a*, and operation signals from the operation devices 23 and 24.

The hydraulic system 90 according to the present embodiment has: a control valve block 4 having the boom control valve 45, the arm control valve 46, the bleed-off valve 140, the check valves 41 and 42, and the relief valve 47; a first solenoid valve block 5 having the solenoid valves 51 and 52; a second solenoid valve block 6 having the solenoid valves 61, 62, and 63; and a pilot primary pressure generation block 7 having the pilot pressure reducing valve 71, the check valve 72, and the lock valve 74.

Figure 3:
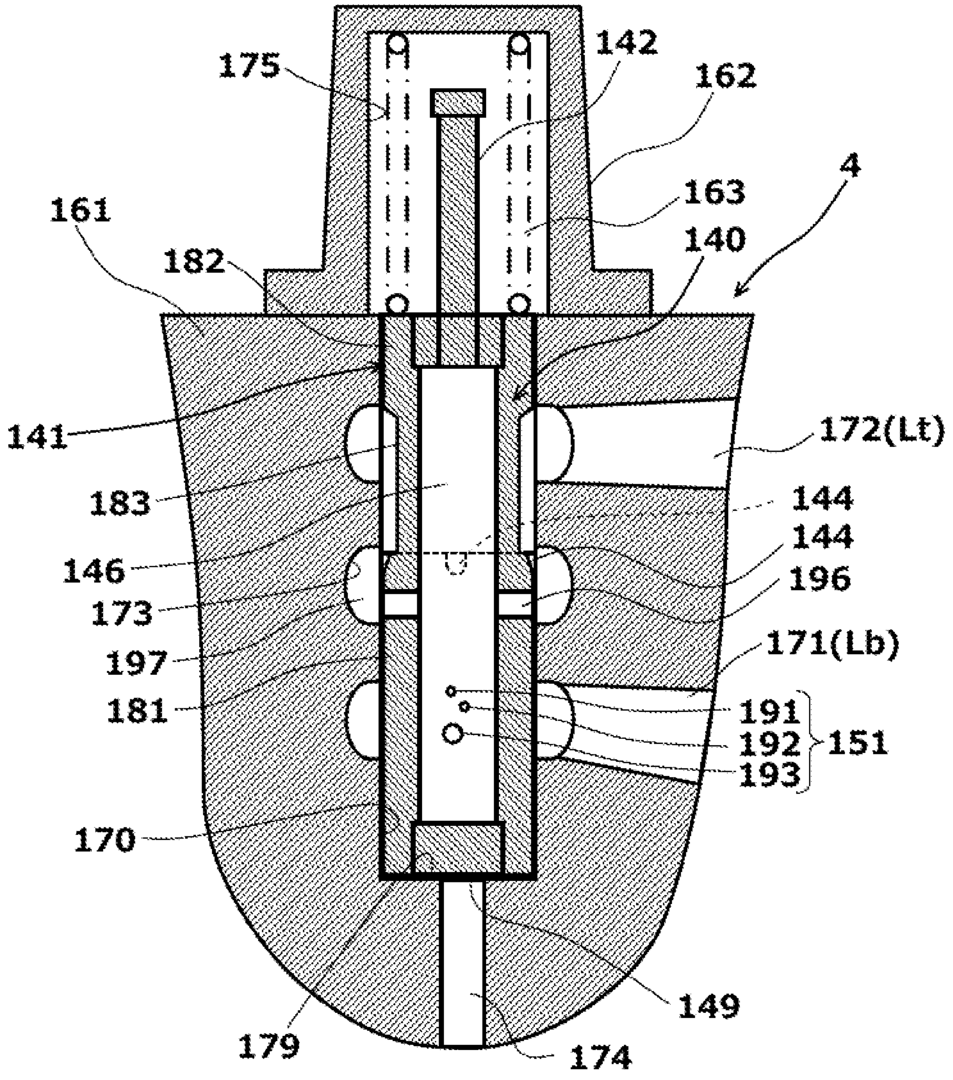
FIG. 3 is a cross-sectional schematic diagram of a bleed-off valve according to the present embodiment.

The structure of the bleed-off valve 140 is explained with reference to FIG. 3. FIG. 3 is a cross-sectional schematic diagram of the bleed-off valve 140 mounted on the control valve block 4. As depicted in FIG. 3, the bleed-off valve 140 has a valve body 161 configuring part of the valve housing of the control valve block 4, and the spool 141 which is a columnar valve body. Note that whereas the following explains each section in relation to the upward/downward and leftward/rightward directions in the figures, the bleed-off valve 140 is not necessarily arranged in the direction as depicted in the figure, but can be arranged in various directions.

The valve body 161 has: a sliding hole 170 that houses the spool 141 slidably; a supply passage (equivalent to the bleed-off passage Lb) 171 that communicates with the sliding hole 170, and receives a supply of the hydraulic working fluid delivered from the pump 81; a discharge passage (equivalent to the tank passage Lt) 172 that establishes communication between the sliding hole 170 and the tank 19; a fluid chamber 197 that is provided in the sliding hole 170 such that the fluid chamber 197 is adjacent to each of the supply passage 171 and the discharge passage 172 between the supply passage 171 and the discharge passage 172; and a pilot passage 174 to which the pilot secondary pressure generated at the solenoid valve 63 is introduced. Note that the lower end of the sliding hole 170 and the lower end of the spool 141 form the pilot pressure receiving section (pressure receiving chamber) 149. In addition, each of the supply passage 171 and the discharge passage 172 is connected to an annular recess portion formed so as to be radially outwardly recessed from the sliding surface of the spool 141 in the sliding hole 170.

The sliding hole 170 is formed so as to have an opening at an end surface (the upper end surface in the figure) of the valve body 161, and a valve cap 162 is attached to the valve body 161 so as to cover the opening. By attaching the valve cap 162 to the valve body 161, a spring chamber 175 is formed on the upper end side, in the figure, of the spool 141. Note that a drain passage (not depicted) that establishes communication between the spring chamber 175 and the tank 19 is formed through the valve cap 162. Because of this, the pressure inside the spring chamber 175 is kept at a pressure equivalent to the tank pressure.

The spring chamber 175 houses the return spring 163 as an urging member that gives a spring force to the spool 141. The return spring 163 is a compression coil spring that urges the spool 141 in a direction to increase the opening area of the restrictor 150 of the bleed-off valve 140 (the downward direction in the figure). The pilot passage 174 introduces the pilot secondary pressure generated at the solenoid valve 63 to the pilot pressure receiving section 149. The hydraulic working fluid introduced to the pilot pressure receiving section 149 urges the spool 141 in a direction to decrease the opening area of the restrictor 150 of the bleed-off valve 140 (i.e. the direction of opposite to the urging direction of the return spring 163). The spool 141 stops at a position at which the thrust due to the pilot secondary pressure and the spring force of the return spring 163 are balanced. In this manner, the spool 141 is moved in the axial direction by the pilot secondary pressure generated by the solenoid valve 63, thereby changing the opening area (opening) of the restrictor 150.

The spool 141 has an internal passage 146 extending in the axial direction and having a circular cross section. The internal passage 146 is a hole formed so as to penetrate the spool 141 in the axial direction. The upper end side opening of the spool 141 is blocked by a rod 142. The rod 142 is linked to the spool 141, and extends upward direction from the upper end of the spool 141. The lower end side opening of the spool 141 is blocked by a plug. Note that the axial direction means the central axial direction of the spool 141, that is, the moving direction of the spool 141.

The outer diameter of the pilot passage 174 is smaller than the outer diameter of the sliding hole 170. Because of this, a step surface 179 is formed between the sliding hole 170 and the pilot passage 174. When the lower end of the spool 141 abuts on the step surface 179, the downward movement of the spool 141 is restricted. In addition, when the distal end of the rod 142 abuts on the valve cap 162, the upward movement of the spool 141 is restricted.

Accordingly, the spool 141 can move in the axial direction between the neutral position (a stroke end on a first end side) at which the downward movement is restricted by abutting on the step surface 179, and the interruption position (a stroke end on a second end side) at which the upward movement is restricted when the rod 142 abuts on the valve cap 162.

The spool 141 is arranged at a position (neutral position) where the lower end of the spool 141 abuts on the step surface 179 between the sliding hole 170 and the pilot passage 174 due to the urging force of the return spring 163, when the pressure of the pilot pressure receiving section 149 is equivalent to the tank pressure.

The spool 141 has, as a plurality of land portions that slide along the inner circumferential surface of the sliding hole 170, a first land portion 181 provided on the lower end side (the first end side in the axial direction), and a second land portion 182 provided on the upper end side (the second end side in the axial direction). The first land portion 181 and the second land portion 182 are provided while being spaced apart from each other in the axial direction. Because of this, an annular groove 183 that is radially inwardly recessed from the first land portion 181 and the second land portion 182 is formed between the first land portion 181 and the second land portion 182 on the outer circumference of the spool 141.

The fluid chamber 197 is formed by an annular recess portion 173 that is formed so as to radially outwardly recessed from the sliding surface of the spool 141 in the sliding hole 170. The outer circumferential portion of the first land portion 181 interrupts communication between the supply passage 171 and the fluid chamber 197 on the outer circumference side of the spool 141. As mentioned later, the supply passage 171 and the fluid chamber 197 communicate with each other via the internal passage 146 of the spool 141. In addition, the first land portion 181 establishes or interrupts communication between the fluid chamber 197 and the discharge passage 172.

As a plurality of through holes penetrating in the radial direction of the spool 141, a first inlet hole 191, a second inlet hole 192, a third inlet hole 193, and outlet holes 196 are formed at the first land portion 181. These through holes (191, 192, 193, and 196) are formed such that their cross sections are circular. The one first inlet hole 191, the one second inlet hole 192, and the one third inlet hole 193 are provided. A plurality of the outlet holes 196 are provided, and are arranged while being spaced apart from each other in the circumferential direction. Note that the radial direction (radial direction) of the spool 141 is orthogonal to the axial direction of the spool 141.

The lower end of the second inlet hole 192 is formed at a position apart from the upper end of the third inlet hole 193 by a predetermined distance in the upward direction in the figure. The lower end of the first inlet hole 191 is formed at a position apart from the upper end of the second inlet hole 192 by a predetermined distance in the upward direction in the figure. The lower ends of the outlet holes 196 are formed at positions apart from the upper end of the second inlet hole 192 by a predetermined distance in the upward direction in the figure.

In the present embodiment, the first inlet hole 191, the second inlet hole 192, and the third inlet hole 193 form a first restrictor 151 that functions as the restrictor 150 that gives a resistance to the passing hydraulic working fluid. The outlet holes 196 are communication holes that always establish communication between the internal passage 146 and the fluid chamber 197 independently of the position of the spool 141.

Figure 6:
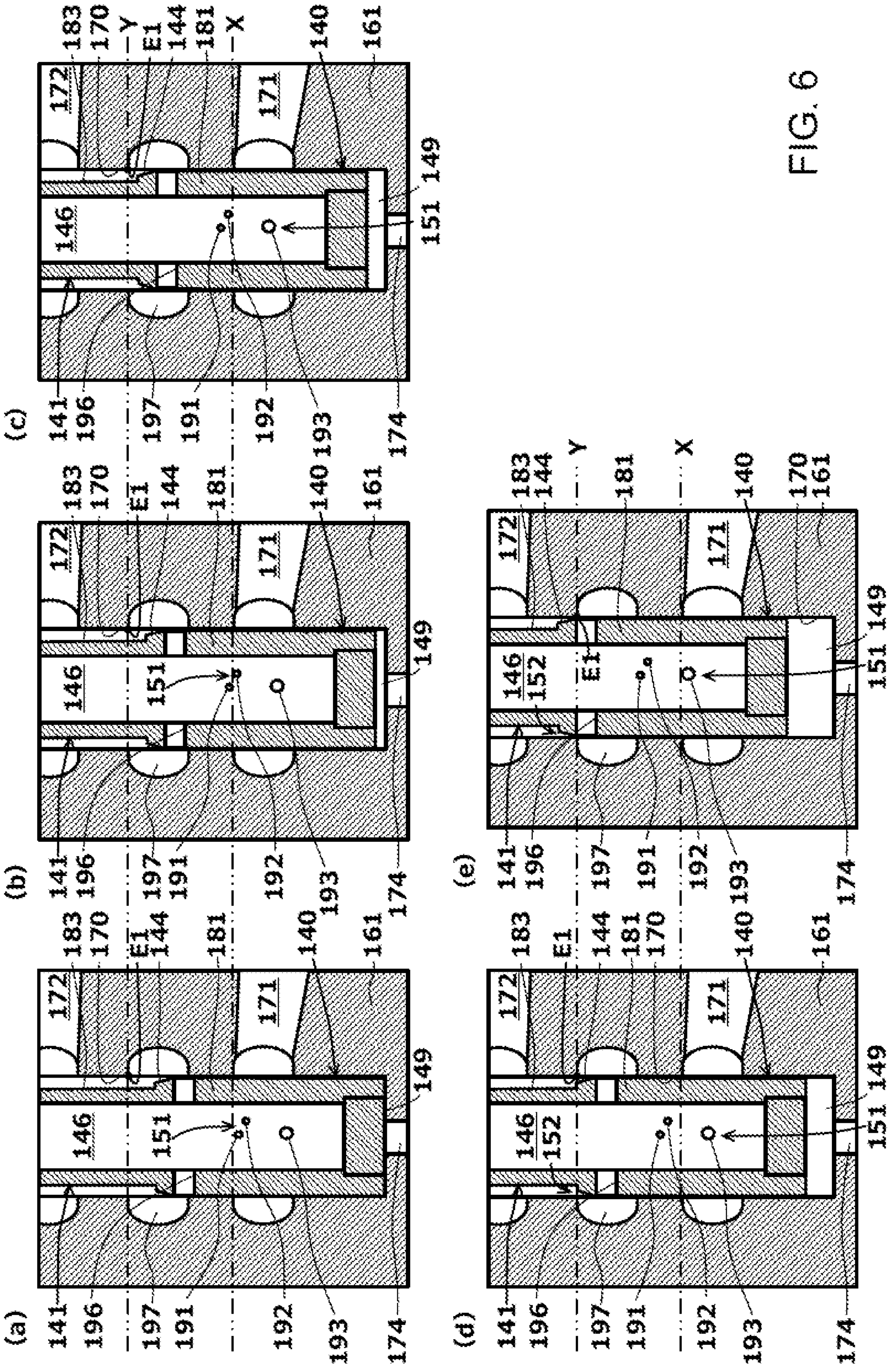
FIG. 6 is a figure for explaining a flow of a hydraulic working fluid when the spool is at each position.

The first inlet hole 191 and the second inlet hole 192, which are restricting holes, establish communication between the supply passage 171 and the internal passage 146 when the spool 141 is positioned at the neutral position on the first end side of the sliding hole 170 (see FIG. 6(*a*)), and interrupt communication between the supply passage 171 and the internal passage 146 when the spool 141 is positioned at a position which is apart from the neutral position by a predetermined distance toward the second end side of the sliding hole 170 (see FIG. 6(*c*) to FIG. 6(*e*)).

When the first inlet hole 191 is in the interrupting state, the opening area of the restrictor 150 of the bleed-off valve 140 becomes smaller than that when the first inlet hole 191 is in the communicating state. When the second inlet hole 192 is in the interrupting state, the opening area of the restrictor 150 of the bleed-off valve 140 is smaller than that when the second inlet hole 192 is in the communicating state. That is, the first inlet hole 191 and the second inlet hole 192 establish or interrupt communication between the supply passage 171 and the internal passage 146, thereby functioning as adjustment holes that adjust the opening area of the restrictor 150 of the bleed-off valve 140.

Note that the third inlet hole 193, which is a restricting hole, always establishes communication between the supply passage 171 and the internal passage 146 independently of the position of the spool 141.

Figure 4:
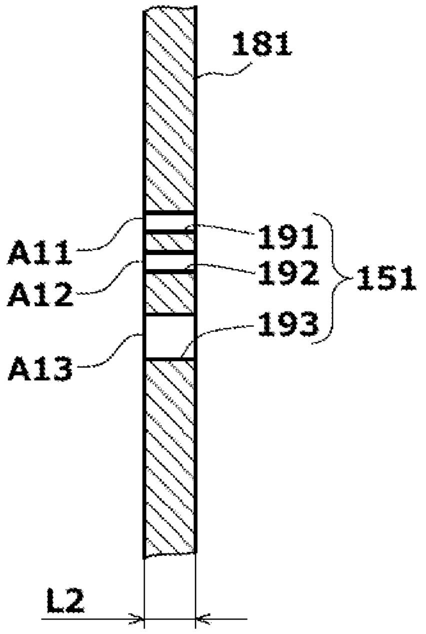
FIG. 4 is a cross-sectional schematic diagram depicting an enlarged view of part of a first land portion, and depicts a first inlet hole, a second inlet hole, and a third inlet hole.

FIG. 4 is a cross-sectional schematic diagram depicting an enlarged view of part of the first land portion 181, and depicts the first inlet hole 191, the second inlet hole 192, and the third inlet hole 193. The total value (total opening area) of the opening areas of the first inlet hole 191, the second inlet hole 192, and the third inlet hole 193 is sufficiently smaller than the total value (total opening area) of the opening areas of the plurality of outlet holes 196 (see FIG. 3). Stated differently, the plurality of outlet holes 196 are formed such that their total opening area is sufficiently greater than the total opening area of the plurality of inlet holes (restricting holes) to the extent that the passage pressure drop at the outlet holes 196 is so small as to be negligible, as compared to the passage pressure drops at the inlet holes (191, 192, and 193).

As depicted in FIG. 4, the opening area of the first inlet hole 191 is A11, the opening area of the second inlet hole 192 is A12, and the opening area of the third inlet hole 193 is A13. In the present embodiment, the opening area A13 of the third inlet hole 193 is greater than the opening area A12 of the second inlet hole 192. In addition, the opening area A13 of the third inlet hole 193 is greater than the opening area A11 of the first inlet hole 191. Note that the opening area A11 of the first inlet hole 191 may be greater than, smaller than, or the same as the opening area A12 of the second inlet hole 192.

As depicted in FIG. 3, a plurality of cutout portions 144 (e.g. four cutout portions 144) are formed at the upper end (axial end) of the first land portion 181. The plurality of cutout portions 144 are provided while being spaced apart from each other in the circumferential direction of the first land portion 181. The cutout portion 144 is formed in a groove-like shape that is radially inwardly recessed from the outer circumferential surface of the first land portion 181. The cutout portion 144 can also be said as a recess portion having an opening toward the upper end surface and the outer circumferential surface of the first land portion 181. In addition, the cutout portion 144 extend from the upper end surface of the first land portion 181 in the axial direction of the spool 141 by a predetermined length L1 (see FIG. 5(*a*)).

The bottom of the groove-like cutout portion 144 inclines from the upper end surface toward the lower end side of the first land portion 181 such that the distance in the radial direction from the sliding surface of the spool 141 in the sliding hole 170 gradually decreases. Note that the cutout portion 144 means a portion having a shape formed by cutting out the axial end of the first land portion 181. That is, the cutout portion 144 may be formed by machining or may be formed by a processing method such as forging or molding.

Note that the cross-sectional shape of the cutout portion 144 can be various shapes such as a quadrangular shape, a semicircular shape, a triangular shape, and the like. In addition, instead of the plurality of groove-like cutout portions 144, a tapered cutout portion where an inclined portion is formed over the entire circumference of the axial end of the first land portion 181 may be provided.

Figure 5:
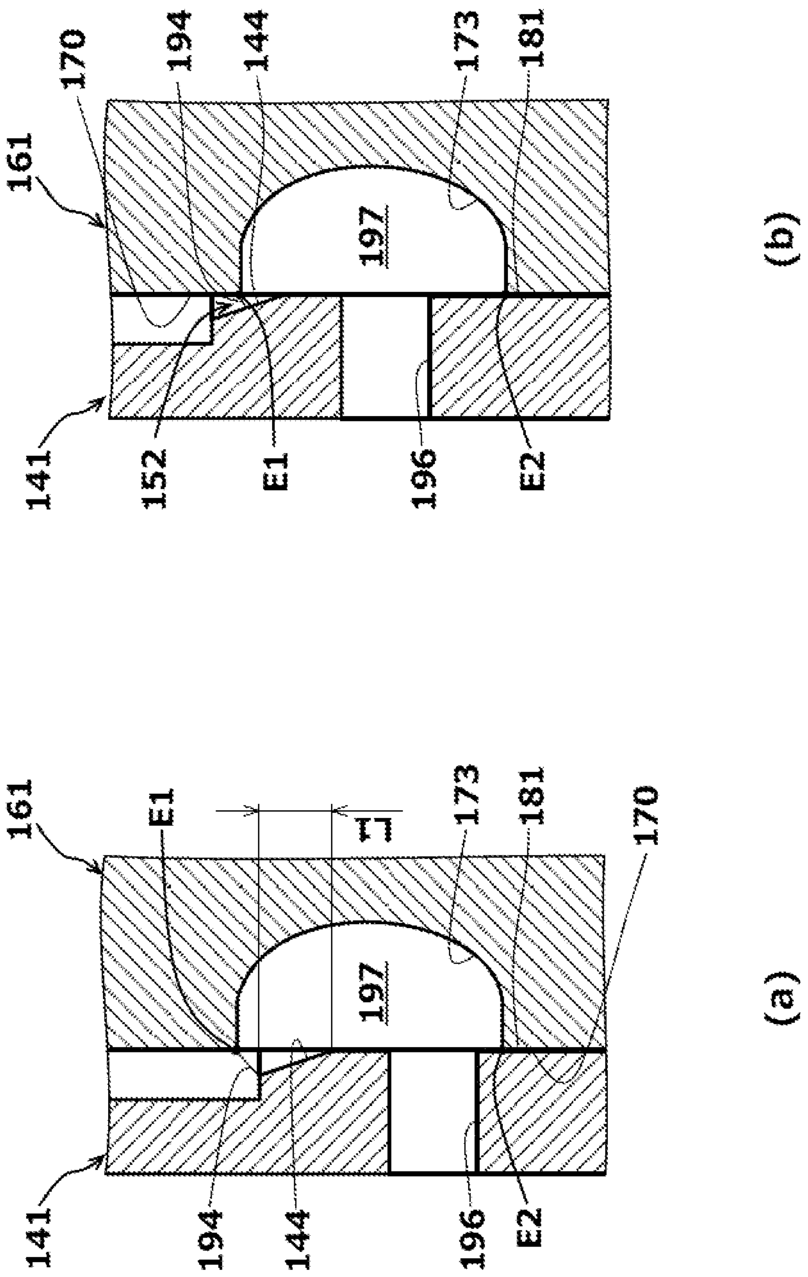
FIG. 5 is a cross-sectional schematic diagram depicting an enlarged view of part of a spool and a valve body, and depicts outlet holes, a fluid chamber, and cutout portions.

FIG. 5 is a cross-sectional schematic diagram depicting an enlarged view of part of the spool 141 and the valve body 161, and depicts the outlet hole 196, the fluid chamber 197, and the cutout portion 144. As depicted in FIG. 5, the valve body 161 has a corner (hereinafter, written as an upper corner) E1 formed at a position where the upper end surface of the annular recess portion 173 and the sliding surface of the sliding hole 170 intersect, and has a corner (hereinafter, written as a lower corner) E2 formed at a position where the lower end surface of the annular recess portion 173 and the sliding surface of the sliding hole 170 intersect.

FIG. 5(*a*) depicts a state where the upper corner E1 is not facing the cutout portions 144 in the radial direction, and FIG. 5(*b*) depicts a state where the upper corner E1 is facing the cutout portions 144 in the radial direction. In the state depicted in FIG. 5(*b*), the opening area A20 of a flow channel cross section 194 formed by the cutout portions 144 and the upper corner E1 is smaller than that in the state depicted in FIG. 5(*a*). Note that the flow channel cross section 194 formed by the cutout portions 144 and the upper corner E1 means a flow channel cross section including a straight line linking the upper corner E1 and the cutout portion 144 to each other with the shortest distance. Because of this, in the state depicted in FIG. 5(*b*), the hydraulic working fluid passing through the flow channel cross section 194 formed by the cutout portions 144 and the upper corner E1 is given a resistance which is greater than in the state depicted in FIG. 5(*a*).

In the present embodiment, a second restrictor 152 is formed by a clearance between the cutout portions 144 formed at the first land portion 181 of the spool 141 and the sliding hole 170 of the valve body 161. Accordingly, the restrictor 150 of the bleed-off valve 140 according to the present embodiment includes: the first restrictor 151 (see FIG. 4) formed by the plurality of restricting holes (191, 192, and 193); and the second restrictor 152 (see FIG. 5(*b*)) formed by the clearance between the cutout portions 144 and the sliding hole 170.

Note that, as depicted in FIG. 4, the restricting holes (191, 192, and 193) are formed such that their radial-direction length L2 is shorter than the axial-direction length L1 (see FIG. 5(*a*)) of the cutout portions 144.

Next, the combined opening area (opening) of the restrictor 150 including the first restrictor 151 and the second restrictor 152 is explained. The first inlet hole 191, the second inlet hole 192, and the third inlet hole 193 included in the first restrictor 151 are provided as parallel openings. Because of this, the opening area A10 of the first restrictor 151 is equivalent to the sum total of the opening areas of the inlet holes (191, 192, and 193) where the hydraulic working fluid passes through. In addition, the first restrictor 151 and the second restrictor 152 are provided as serial openings. Because of this, the combined opening area (effective areas) A0 of the first restrictor 151 and the second restrictor 152 is represented by the following Formula (1).

$$A_0 = \frac{A_{10} \cdot A_{20}}{\sqrt{A_{10}^2 + A_{20}^2}} \tag{1}$$

Here, A10 is the opening area of the first restrictor 151, and A20 is the opening area of the second restrictor 152 (the opening area of the flow channel cross section 194). Note that the flow channel cross section 194 is a flow channel cross section that minimizes the cross-sectional area of a flow channel formed by the clearance between the cutout portions 144 and the sliding hole 170.

Figure 7:
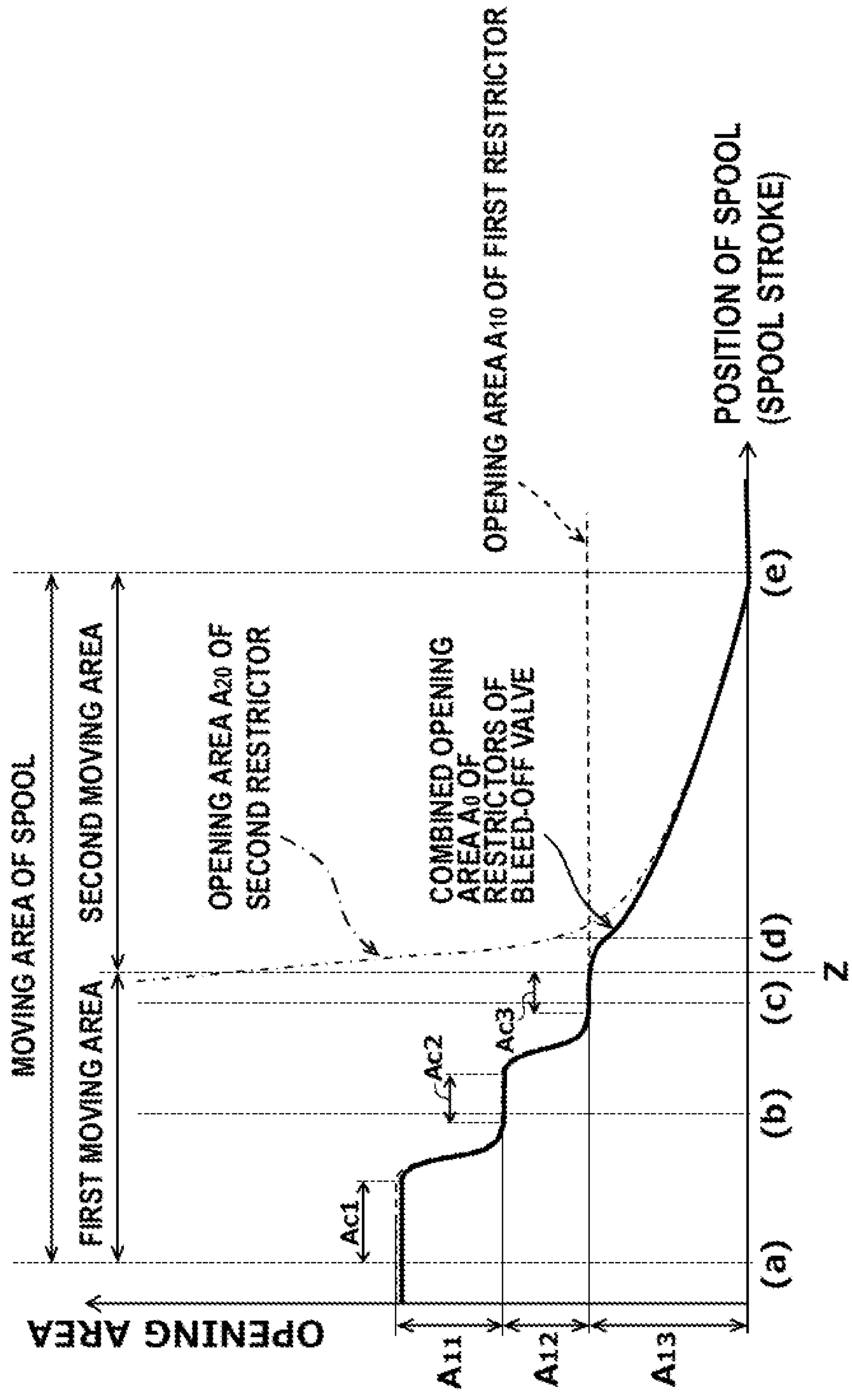
FIG. 7 is a figure depicting an opening area A10 of a first restrictor, an opening area A20 of a second restrictor, and a combined opening area A0 of the restrictors when the spool is at each position.

FIG. 6 is a figure for explaining a flow of the hydraulic working fluid when the spool 141 is at each position. FIG. 7 is a figure depicting the opening area A10 of the first restrictor 151 (broken line), the opening area A20 of the second restrictor 152 (dash-dotted line) and the combined opening area A0 of the restrictor 150 (thick solid line) when the spool 141 is at each position. In addition, in FIG. 6, a position Y of the upper corner E1, and a position X of the upper end of the annular recess portion connected to the supply passage 171 are represented by two-dot chain lines. In FIG. 7, the horizontal axis represents the position of the spool 141 (spool stroke), and the vertical axis represents the opening areas. Note that reference characters (a) to (e) given to the horizontal axis of FIG. 7 correspond to the position of the spool 141 in states of FIG. 6(*a*) to FIG. 6(*e*).

FIG. 6(*a*) depicts a state where the spool 141 is positioned at the neutral position, which is a stroke end on the first end side in the axial direction. In the state depicted in FIG. 6(*a*), the hydraulic working fluid is introduced from the supply passage 171 of the valve body 161 through the first inlet hole 191, second inlet hole 192, and third inlet hole 193 of the spool 141 to the internal passage 146 of the spool 141. The hydraulic working fluid introduced to the internal passage 146 is introduced through the outlet holes 196 of the spool 141 to the fluid chamber 197, and is introduced from the fluid chamber 197 through an annular flow channel between the annular groove 183 and the sliding hole 170 to the discharge passage 172.

As depicted in FIG. 7, in the state of FIG. 6(*a*), the opening area A10 of the first restrictor 151 is equivalent to the sum total of the opening areas of the first inlet hole 191, the second inlet hole 192, and the third inlet hole 193, where the hydraulic working fluid passes through (A10=A11+A12+A13). In addition, in the state of FIG. 6(*a*), the opening area A20 of the second restrictor 152 is sufficiently greater than the opening area A10 of the first restrictor 151. Because of this, as depicted in FIG. 7, in the state of FIG. 6(*a*), the combined opening area A0 of the restrictor 150 is approximately the same as the opening area A10 of the first restrictor 151, and the first restrictor 151 (the first inlet hole 191, the second inlet hole 192, and the third inlet hole 193) mainly functions as the restrictor 150 of the bleed-off valve 140. Stated differently, in the state of FIG. 6(*a*), mainly, the opening area A10 (=A11+A12+A13) of the first restrictor 151 determines the pressure loss of the hydraulic working fluid passing through the bleed-off valve 140, and the pressure loss generated at the second restrictor 152 is so small as to be negligible.

FIG. 6(*b*) depicts a state where, after the state of FIG. 6(*a*), the spool 141 has moved upward in the figure by a predetermined distance, and the first inlet hole 191 is blocked by the inner circumferential surface of the sliding hole 170 of the valve body 161. In the state depicted in FIG. 6(*b*), the hydraulic working fluid is introduced from the supply passage 171 of the valve body 161 through the second inlet hole 192 and third inlet hole 193 of the spool 141 to the internal passage 146 of the spool 141. The hydraulic working fluid introduced to the internal passage 146 is introduced through the outlet holes 196 of the spool 141 to the fluid chamber 197, and is introduced from the fluid chamber 197 through the annular flow channel between the annular groove 183 and the sliding hole 170 to the discharge passage 172.

In the state of FIG. 6(*b*), the first inlet hole 191 is in the interrupting state, and communication between the supply passage 171 and the internal passage 146 through the first inlet hole 191 is interrupted. As depicted in FIG. 7, in the state of FIG. 6(*b*), the opening area A10 of the first restrictor 151 is equivalent to the sum total of the opening areas of the second and third inlet holes 192 and 193, where the hydraulic working fluid passes through (A10=A12+A13). In addition, in the state of FIG. 6(*b*), the opening area A20 of the second restrictor 152 is sufficiently greater than the opening area A10 of the first restrictor 151. Because of this, as depicted in FIG. 7, in the state of FIG. 6(*b*), the combined opening area A0 of the restrictor 150 is approximately the same as the opening area A10 of the first restrictor 151, and the first restrictor 151 (the second inlet hole 192 and the third inlet hole 193) mainly functions as the restrictor 150 of the bleed-off valve 140. Stated differently, in the state of FIG. 6(*b*), mainly, the opening area A10 (=A12+A13) of the first restrictor 151 determines the pressure loss of the hydraulic working fluid passing through the bleed-off valve 140, and the pressure loss generated at the second restrictor 152 is so small as to be negligible.

FIG. 6(*c*) depicts a state where, after the state of FIG. 6(*b*), the spool 141 has moved upward in the figure by a predetermined distance, and the first inlet hole 191 and the second inlet hole 192 are blocked by the inner circumferential surface of the sliding hole 170 of the valve body 161. In the state depicted in FIG. 6(*c*), the hydraulic working fluid is introduced from the supply passage 171 of the valve body 161 through the third inlet hole 193 of the spool 141 to the internal passage 146 of the spool 141. The hydraulic working fluid introduced to the internal passage 146 is introduced through the outlet holes 196 of the spool 141 to the fluid chamber 197, and is introduced from the fluid chamber 197 through the annular flow channel between the annular groove 183 and the sliding hole 170 to the discharge passage 172.

In the state of FIG. 6(*c*), the first inlet hole 191 and the second inlet hole 192 are in the interrupting states, and communication between the supply passage 171 and the internal passage 146 through the first inlet hole 191 and the second inlet hole 192 is interrupted. As depicted in FIG. 7, in the state of FIG. 6(*c*), the opening area A10 of the first restrictor 151 is equivalent to the opening area of the third inlet hole 193 where the hydraulic working fluid passes through (A10=A13). In addition, in the state of FIG. 6(*c*), the opening area A20 of the second restrictor 152 is sufficiently greater than the opening area A10 of the first restrictor 151. Because of this, as depicted in FIG. 7, in the state of FIG. 6(*c*), the combined opening area A0 of the restrictor 150 is approximately the same as the opening area A10 of the first restrictor 151, and the first restrictor 151 (the third inlet hole 193) mainly functions as the restrictor 150 of the bleed-off valve 140. Stated differently, in the state of FIG. 6(*c*), mainly, the opening area A10 (=A13) of the first restrictor 151 determines the pressure loss of the hydraulic working fluid passing through the bleed-off valve 140, and the pressure loss generated at the second restrictor 152 is so small as to be negligible.

FIG. 6(*d*) depicts a state where, after the state of FIG. 6(*c*), the spool 141 has moved upward in the figure by a predetermined distance, and the upper corner E1 of the valve body 161 and the upper end of the first land portion 181 are facing each other in the radial direction, that is, the axial position of the upper end surface of the first land portion 181 matches the position Y of the upper corner E1. In the state depicted in FIG. 6(*d*), the hydraulic working fluid is introduced from the supply passage 171 of the valve body 161 through the third inlet hole 193 of the spool 141 to the internal passage 146 of the spool 141. The hydraulic working fluid introduced to the internal passage 146 is introduced through the outlet holes 196 of the spool 141 to the fluid chamber 197. The hydraulic working fluid introduced to the fluid chamber 197 passes through the second restrictor 152 formed by the clearance between the cutout portions 144 of the first land portion 181 and the sliding hole 170, and is introduced through the annular flow channel between the annular groove 183 and the sliding hole 170 to the discharge passage 172.

In the state of FIG. 6(*d*), the first inlet hole 191 and the second inlet hole 192 are in the interrupting states, and communication between the supply passage 171 and the internal passage 146 through the first inlet hole 191 and the second inlet hole 192 is interrupted. As depicted in FIG. 7, in the state of FIG. 6(*d*), the opening area A10 of the first restrictor 151 is equivalent to the opening area of the third inlet hole 193 where the hydraulic working fluid passes through (A10=A13). In addition, as depicted in FIG. 7, in the state of FIG. 6(*d*), the opening area A20 of the second restrictor 152 is smaller than in the state of FIG. 6(*c*), and the pressure loss generated at the second restrictor 152 has become great to the extent that it cannot be negligible. Because of this, as depicted in FIG. 7, in the state of FIG. 6(*d*), the first restrictor 151 (third inlet hole 193) and the second restrictor 152 (flow channel cross section 194) function as the restrictor 150 of the bleed-off valve 140.

When the spool 141 further moves upward in the figure after the state depicted in FIG. 6(*d*), as depicted in FIG. 7, the opening area A20 of the second restrictor 152 approaches the combined opening area A0, and the pressure loss at the second restrictor 152 becomes dominant. Accordingly, the second restrictor 152 (flow channel cross section 194) mainly functions as the restrictor 150 of the bleed-off valve 140.

FIG. 6(*e*) depicts a state where, after the state of FIG. 6(*d*), the spool 141 has moved upward in the figure by a predetermined distance, and the spool 141 is positioned at the interruption position, which is a stroke end on the second end side in the axial direction. In the state of FIG. 6(*e*), the first land portion 181 interrupts communication between the fluid chamber 197 and the discharge passage 172. Thus, as depicted in FIG. 7, the combined opening area A0 of the restrictor 150 becomes 0 (zero), and the bleed-off flow rate becomes 0 (zero). That is, the hydraulic working fluid delivered from the pump 81 is no longer discharged through the bleed-off valve 140 to the tank 19.

In this manner, in the present embodiment, as depicted in FIG. 7, the first restrictor 151 is formed such that its opening area A10 decreases stepwise as the spool 141 moves from the first end side (the lower end side in the figure) toward the second end side (the upper end side in the figure) of the sliding hole 170. In addition, the second restrictor 152 is formed such that its opening area A20 decreases continuously as the spool 141 moves from the first end side (the lower end side in the figure) toward the second end side (the upper end side in the figure) of the sliding hole 170. Because of this, as the spool 141 moves upward direction from the neutral position (a) to a predetermined position z, the combined opening area A0 decreases stepwise, and as the spool 141 moves upward direction from the predetermined position Z to the interruption position (e), the combined opening area A0 decreases continuously.

As a moving area in its axial direction, the spool 141 has: a first moving area (from the neutral position (a) to the predetermined position Z) where the combined opening area A0 changes stepwise; and a second moving area (from the predetermined position Z to the interruption position (e)) where the combined opening area A0 changes continuously. Specifically, the first moving area is an area where the combined opening area A0 decreases stepwise from (A11+A12+A13) through (A12+A13) to (A13) as the spool 141 moves upward in the figure from the neutral position, and has moving areas Ac1, Ac2, and Ac3 where the combined opening area A0 can be keep constant along with the movement of the spool 141. The neutral position depicted in FIG. 6(*a*) is set in the moving area Ac1, the position depicted in FIG. 6(*b*) is set in the moving area Ac2, and the position depicted in FIG. 6(*c*) is set in the moving area Ac3. In addition, in the second moving area, the combined opening area A0 decreases continuously until it becomes 0 (zero) as the spool 141 moves upward in the figure.

Note that the opening areas A11, A12, and A13 of the first inlet hole 191, the second inlet hole 192, and the third inlet hole 193 are set such that the pressure loss (passage pressure drop) of the passing hydraulic working fluid becomes a target value when the flow rate of the hydraulic working fluid delivered from the pump 81 is the minimum flow rate. In the present embodiment, the opening areas A11, A12, and A13 are set so as to generate such a pressure loss that makes a pump delivery pressure (circuit pressure) P a first target value P1 (e.g. 2 MPa) in the state of FIG. 6(*a*), makes the pump delivery pressure (circuit pressure) P a second target value P2 (e.g. 3 MPa) in the state of FIG. 6(*b*), and makes the pump delivery pressure (circuit pressure) P a third target value P3 (e.g. 4 MPa) in the state of FIG. 6(*c*).

The first target value P1 of the pump delivery pressure P is set to a value which is equal to or greater than the minimum value of a pressure (circuit pressure) necessary for generation of the pilot primary pressure that allows the movement of the spool 141 of the bleed-off valve 140. Note that, as the first target value P1, a value which is equal to or greater than a circuit pressure that allows the movement of the spool 141 of the bleed-off valve 140 until it reaches the state of FIG. 6(*b*) is adopted. Accordingly, the first target value P1 can be set to a pressure that does not allow the movement of the spools of the control valves 45 and 46 against the centering springs.

The second target value P2 of the pump delivery pressure P is set to a value greater than the first target value P1. Note that, as the second target value P2, a value which is equal to or greater than a circuit pressure that allows the movement of the spool 141 of the bleed-off valve 140 until it reaches the state of FIG. 6(*c*) is adopted. Accordingly, the second target value P2 can be set to a pressure that does not allow the movement of the spools of the control valves 45 and 46 to the full strokes against the centering springs.

The third target value P3 of the pump delivery pressure P is set to a value greater than the second target value P2. Note that, as the third target value P3, a value which is equal to or greater than a circuit pressure that allows the movement of the spool 141 of the bleed-off valve 140 until it reaches the state of FIG. 6(*e*) is adopted. In addition, the third target value P3 is set to a pressure that allows the movement of the spools of the control valves 45 and 46 to the full strokes against the centering springs.

The main controller 100 depicted in FIG. 2 controls the circuit pressure by controlling the solenoid valve 63 such that the spool 141 is positioned in the first moving area (see FIG. 7) when the actuators are not being operated by the operation devices 23 and 24. In addition, the main controller 100 controls the bleed-off flow rate by controlling the solenoid valve 63 such that the spool 141 is positioned in the second moving area (see FIG. 7) when the actuators are being operated by the operation devices 23 and 24 with an operation amount greater than a predetermined value L0 set in advance.

In addition, the main controller 100 performs control such that the circuit pressure becomes P1 by controlling the position of the spool 141 such that the opening area of the restrictor 150 becomes the maximum opening area Amax (=A11+A12+A13), when the gate lock lever device 22 is operated to the lock position. When the actuators are not being operated by the operation devices 23 and 24 in a case where the gate lock lever device 22 is operated to the unlock position, the main controller 100 performs control such that the circuit pressure becomes P2 by controlling the position of the spool 141 such that the opening area of the restrictor 150 becomes an opening area (A12+A13) which is one level smaller than the maximum opening area Amax. When the actuators are being operated by the operation devices 23 and 24 with an operation amount which is equal to or smaller than the predetermined value L0 in a case where the gate lock lever device 22 is operated to the unlock position, the main controller 100 performs control such that the circuit pressure becomes a pressure equal to or higher than P3 by controlling the position of the spool 141 such that the opening area of the restrictor 150 becomes an opening area (A13) which is two levels smaller than the maximum opening area Amax.

Figure 8:
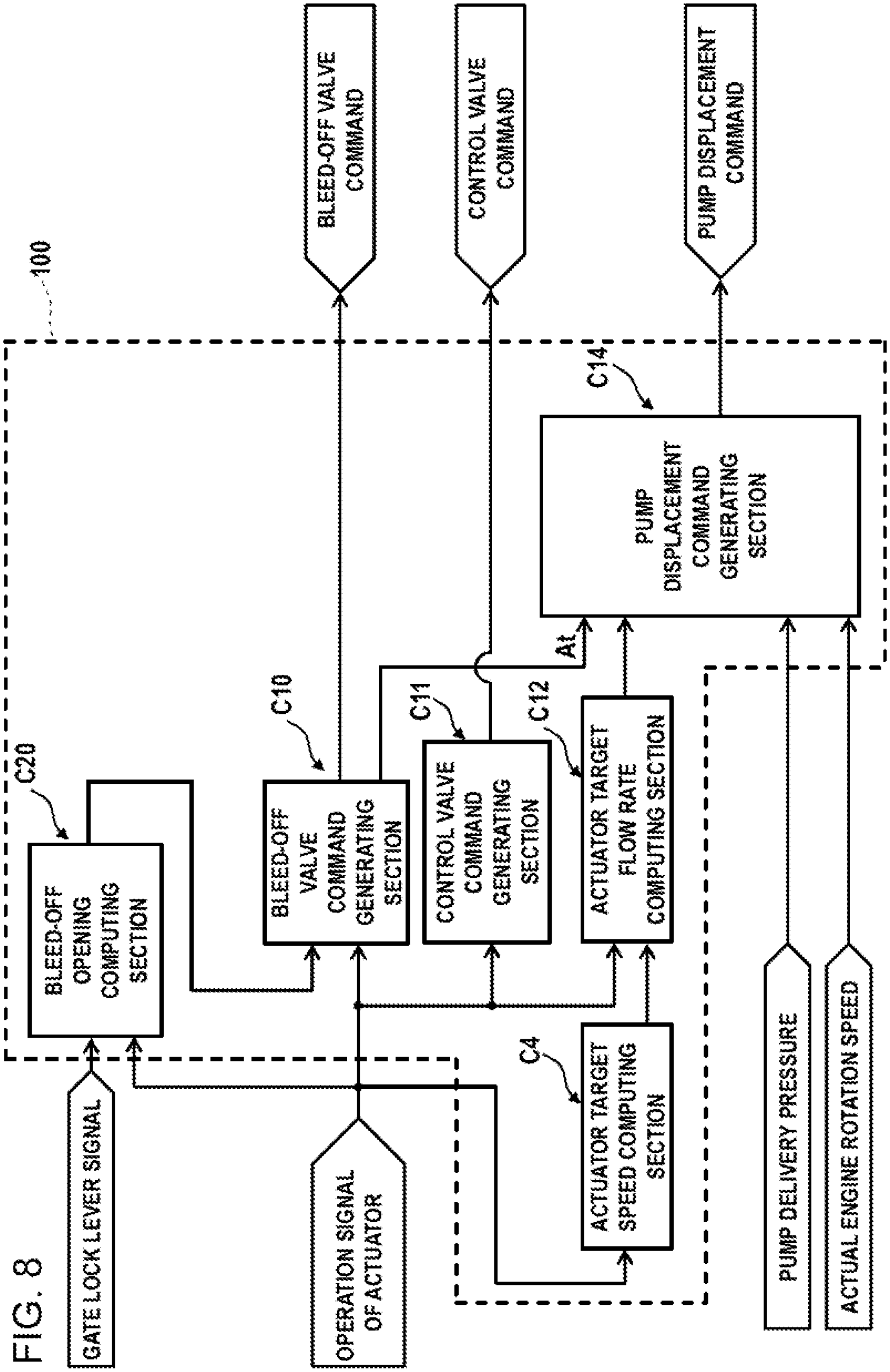
FIG. 8 is a functional block diagram of a main controller.

Hereinbelow, functions of the main controller 100 are explained in detail with reference to FIG. 8 to FIG. 14. FIG. 8 is a functional block diagram of the main controller 100. As depicted in FIG. 8, the main controller 100 functions as an actuator target speed computing section C4, a bleed-off opening computing section C20, a bleed-off valve command generating section C10, a control valve command generating section C11, an actuator target flow rate computing section C12, and a pump displacement command generating section C14 by executing programs stored on the ROM 102.

Figure 9:
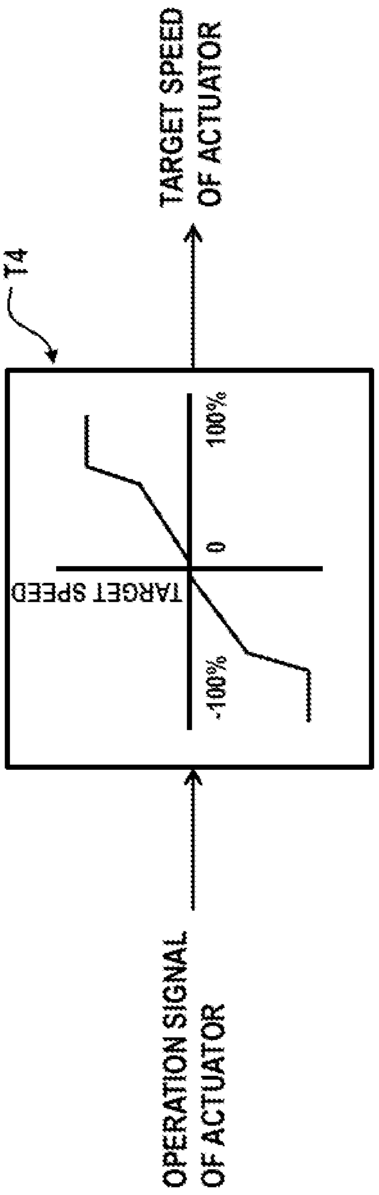
FIG. 9 is a figure depicting the processing content of a computation performed by an actuator target speed computing section.

FIG. 9 is a figure depicting the processing content of a computation performed by the actuator target speed computing section C4. The actuator target speed computing section C4 computes a target speed of each actuator on the basis of information (operation signal) corresponding to the actuator. The following explains a representative example in which a target speed of the boom cylinder (actuator) 11*a* is computed on the basis of an operation signal of the boom cylinder (actuator) 11*a*.

As depicted in FIG. 9, the actuator target speed computing section C4 computes a target speed of the boom cylinder 11*a* on the basis of an operation signal of the boom cylinder 11*a*. The ROM 102 has stored thereon a table T4 in which operation signals and target speeds of the boom cylinder 11*a* are associated with each other. The table T4 represents characteristics that as the absolute value of an operation amount of the operation lever 23*a* increases, the target speed increases. Note that the boom operation device 23 outputs an operation signal representing an operation amount with a positive value when the operation lever 23*a* is inclined in one direction (boom-raising side) from the neutral position, and outputs an operation signal representing an operation amount with a negative value when the operation lever 23*a* is inclined in the other direction (boom-lowering side) from the neutral position.

The actuator target speed computing section C4 refers to the table T4, and computes a target speed of the boom cylinder 11*a* on the basis of an operation signal input from the boom operation device 23. Note that in a case of a positive target speed, this represents a target speed in the extension direction of the boom cylinder 11*a*, and in a case of a negative target speed, this represents a target speed in the contraction direction of the boom cylinder 11*a*.

Note that although not depicted, the actuator target speed computing section C4 computes also target speeds of the arm cylinder 12*a*, the bucket cylinder 13*a*, the travel hydraulic motor 2*a*, and the swing hydraulic motor 3*a*.

Figure 10:
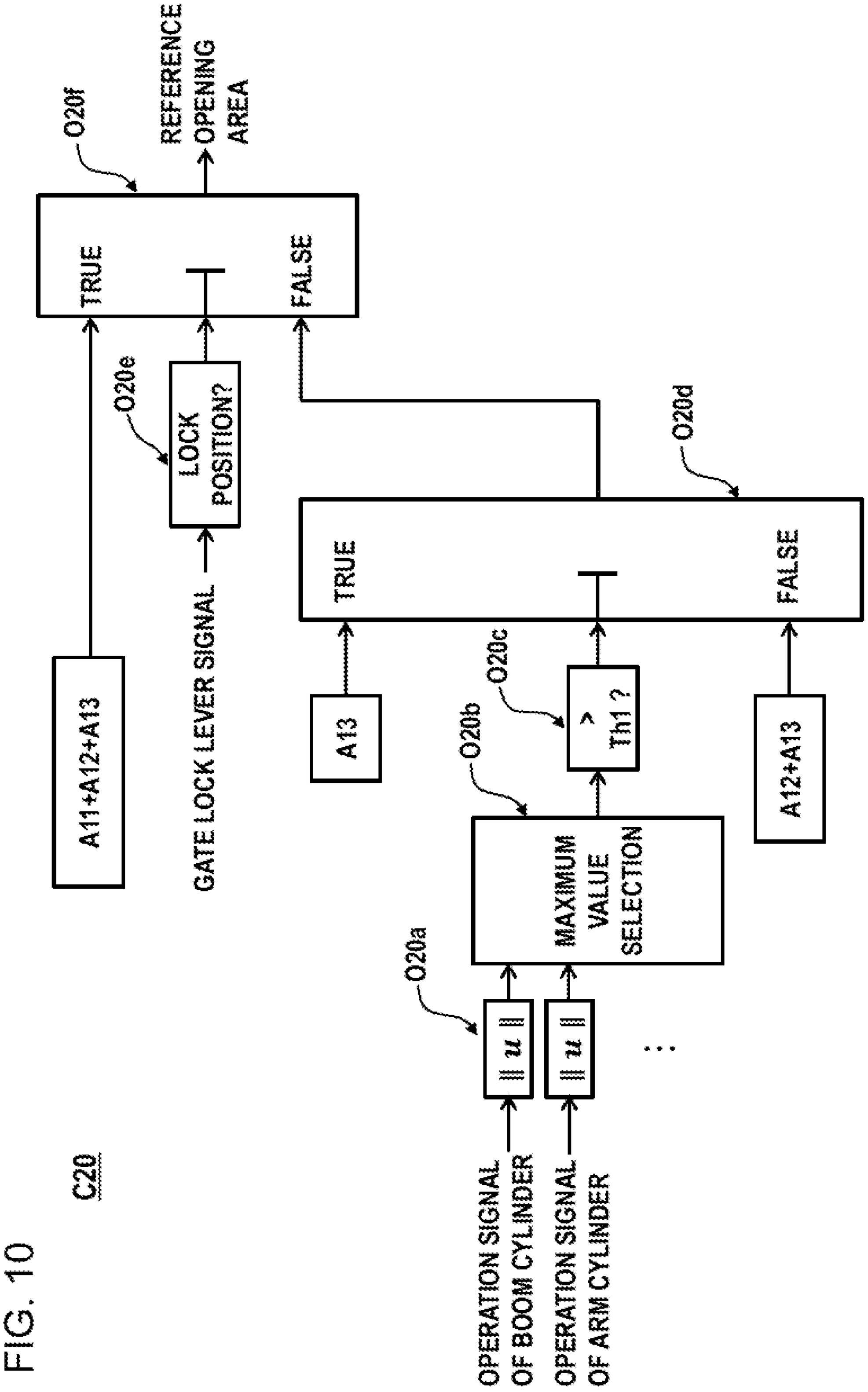
FIG. 10 is a figure depicting the processing content of a computation performed by a bleed-off opening computing section.

FIG. 10 is a figure depicting the processing content of a computation performed by the bleed-off opening computing section C20. As depicted in FIG. 10, the bleed-off opening computing section C20 computes the reference opening area of the bleed-off valve 140 on the basis of a gate lock lever signal and actuator operation signals.

The bleed-off opening computing section C20 functions as a computing section O20*a*, a maximum-value selecting section O20*b*, assessing sections O20*c* and O20*e*, and selecting sections O20*d* and O20*f*. The computing section O20*a* computes the absolute values of the actuator operation signals (a boom cylinder operation signal, an arm cylinder operation signal, etc.). The maximum-value selecting section O20*b* selects the largest one of a plurality of the absolute values (the absolute value of the boom operation amount, the absolute value of the arm operation amount, etc.) computed at the computing section O20*a*.

The assessing section O20*c* assesses whether or not the maximum value selected at the maximum-value selecting section O20*b* is greater than a threshold Th1 set in advance. The threshold Th1 is set in advance for assessing whether or not the actuator operation levers (the operation levers 23*a* and 24*a*, etc.) are being operated, and is stored on the ROM 102. For example, the threshold Th1 is a value which is approximately 3% of the maximum operation amount of the operation levers when such a maximum operation amount is assumed to be 100%. That is, the maximum-value selecting section O20*b* and the assessing section O20*c* assess whether or not at least one of the actuator operation levers (the operation levers 23*a* and 24*a*, etc.) is being operated on the basis of whether or not the maximum value of the operation signals is greater than the threshold Th1.

If the result of the assessment by the assessing section O20*c* is YES, that is, if the maximum value selected at the maximum-value selecting section O20*b* is greater than the threshold Th1, and it is assessed that at least one of the actuator operation levers is being operated, the selecting section O20*d* selects the opening area A13. If the result of the assessment by the assessing section O20*c* is NO, that is, if the maximum value selected at the maximum-value selecting section O20*b* is equal to or smaller than the threshold Th1, and it assessed that none of the actuator operation levers are being operated, the selecting section O20*d* selects an opening area A12+A13.

The assessing section O20*e* assesses whether or not the gate lock lever device 22 is operated to the lock position on the basis of the gate lock lever signal from the gate lock lever device 22.

If the result of the assessment by the assessing section O20*e* is YES, that is, if it is assessed that the gate lock lever device 22 is operated to the lock position, the selecting section O20*f* selects an opening area A11+A12+A13 as the reference opening area, and outputs it to the bleed-off valve command generating section C10. If the result of the assessment by the assessing section O20*e* is NO, that is, if it is assessed that the gate lock lever device 22 is operated to the unlock position, the selecting section O20*f* selects the opening area (A13 or A12+A13) selected at the selecting section O20*d* as the reference opening area, and outputs it to the bleed-off valve command generating section C10.

Figure 11:
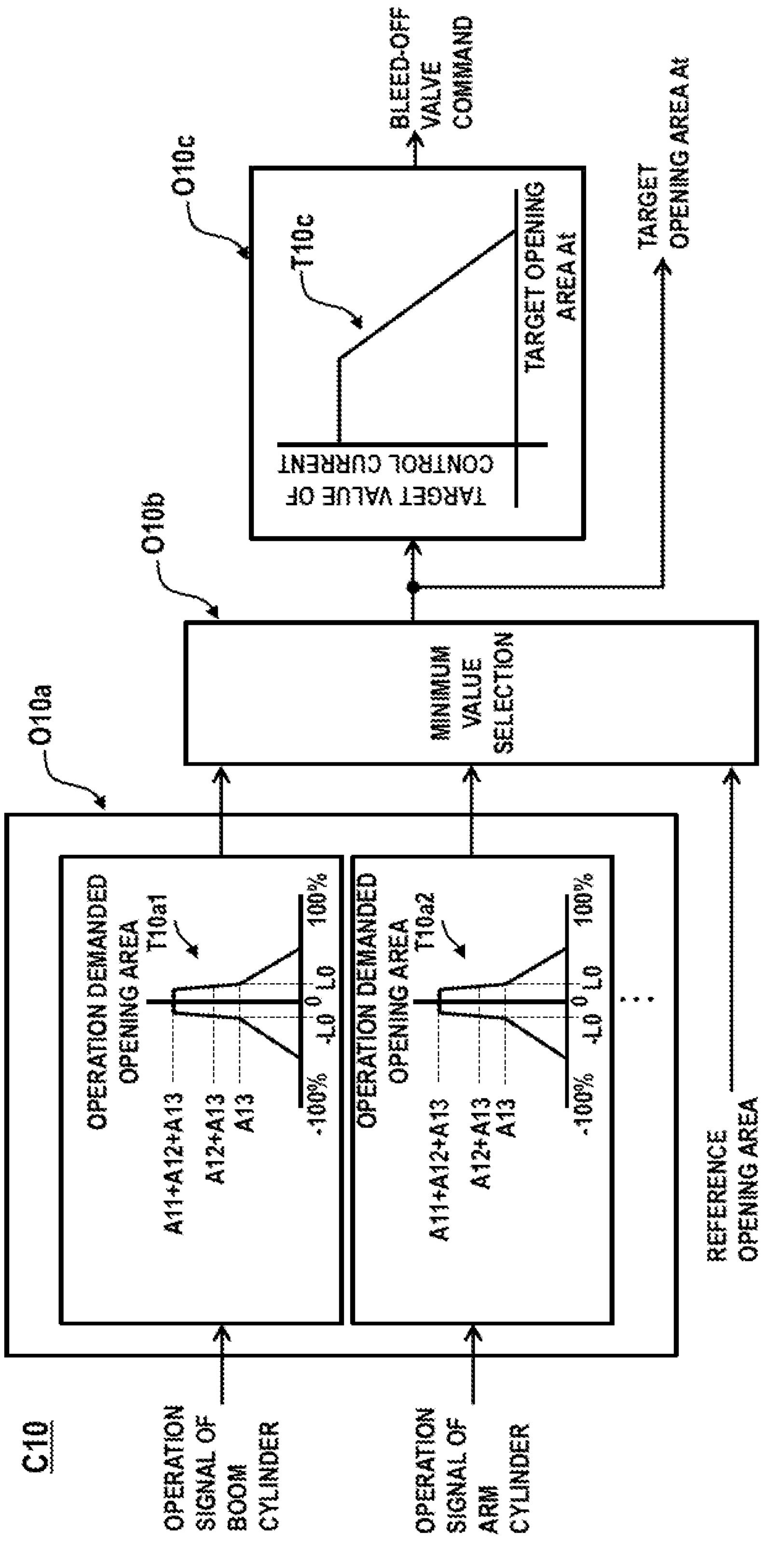
FIG. 11 is a figure depicting the processing content of a computation performed by a bleed-off valve command generating section.

FIG. 11 is a figure depicting the processing content of a computation performed by the bleed-off valve command generating section C10. As depicted in FIG. 11, the bleed-off valve command generating section C10 generates a bleed-off valve command for controlling the solenoid valve 63 to drive the bleed-off valve 140 on the basis of the actuator operation signals and the reference opening area computed at the bleed-off opening computing section C20.

The bleed-off valve command generating section C10 functions as a computing section O10*a*, a minimum-value selecting section O10*b*, and a computing section O10*c*. The ROM 102 has stored thereon tables T10*a*1 and T10*a*2 in which actuator operation signals (an operation signal of the boom cylinder 11*a*, an operation signal of the arm cylinder 12*a*, etc.) and operation demanded opening areas of the bleed-off valve 140 are associated with each other. The computing section O10*a* computes an operation demanded opening area on the basis of an operation signal correspond to each of the actuators. The following explains a representative example in which an operation demanded opening area is computed on the basis of an operation signal of the boom cylinder 11*a*.

The computing section O10*a* computes an operation demanded opening area of the bleed-off valve 140 on the basis of an operation signal of the boom cylinder 11*a*. The table T10*a*1 represents characteristics that as the absolute value of an operation amount of the operation lever 23*a* increases, the operation demanded opening area decreases. According to settings in the present embodiment, when the operation lever 23*a* is positioned at a dead zone including the neutral position, the operation demanded opening area becomes a value equal to or greater than the maximum opening area Amax (≈A11+A12+A13) of the restrictor 150. In addition, according to settings of the table T10*a*1, when the absolute value of an operation amount is the predetermined value L0 set in advance, the operation demanded opening area becomes an area equivalent to the opening area A13 of the third inlet hole 193.

The computing section O10*a* refers to the table T10*a*1, and computes an operation demanded opening area on the basis of an operation signal input from the boom operation device 23. In addition, the computing section O10*a* refers to the table 10*a*2, and computes an operation demanded opening area on the basis of an operation signal input from the arm operation device 24. Furthermore, although not depicted, the computing section 10*a* computes operation demanded opening areas on the basis of an operation signal of the bucket cylinder 13*a*, an operation signal of the travel hydraulic motor 2*a*, and an operation signal of the swing hydraulic motor 3*a*.

The minimum-value selecting section O10*b* selects the smallest one among the plurality of operation demanded opening areas computed at the computing section 10*a* and the reference opening area computed at the bleed-off opening computing section C20, and sets the selected one as the target opening area At of the bleed-off valve 140. The minimum-value selecting section O10*b* outputs the target opening area At of the bleed-off valve 140 to the computing section O10*c*. Note that the minimum-value selecting section O10*b* outputs the target opening area At of the bleed-off valve 140 also to the pump displacement command generating section C14 (see FIG. 8).

The computing section O10*c* refers to a current conversion table T10*c* stored on the ROM 102, and computes a target value of a control current to be supplied to the solenoid valve 63 on the basis of the target opening area At input from the minimum-value selecting section O10*b*. The computing section O10*c* generates a bleed-off valve command for performing control such that the control current supplied to the solenoid valve 63 becomes the target value, and outputs the generated bleed-off valve command to a current control section (not depicted). The current control section controls a control current to be supplied to the solenoid of the solenoid valve 63 such that the control current becomes the target value on the basis of the bleed-off valve command.

Figure 12:
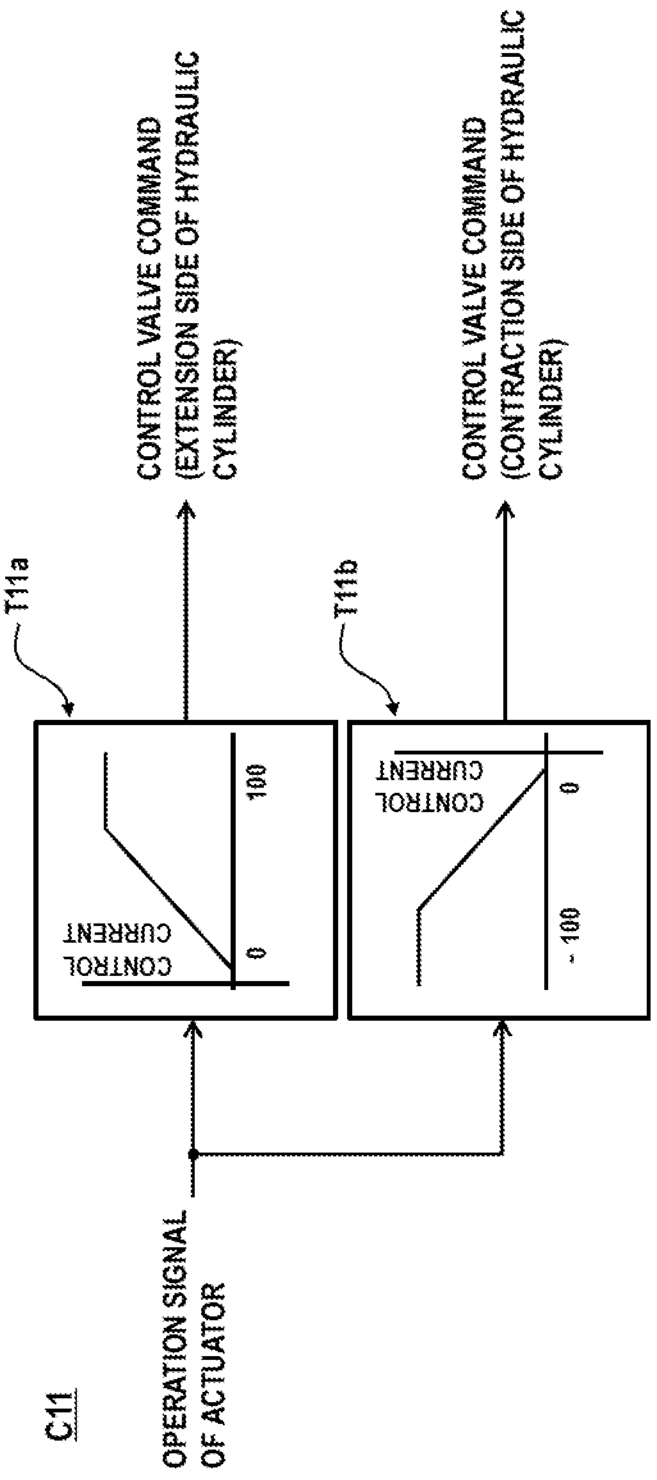
FIG. 12 is a figure depicting the processing content of a computation performed by a control valve command generating section.

FIG. 12 is a figure depicting the processing content of a computation performed by the control valve command generating section C11. As depicted in FIG. 12, the control valve command generating section C11 generates a control valve command for controlling the solenoid valves 51, 52, 61, 62 that drive the control valves 45 and 46. The control valve command generating section C11 refers to a table T11*a* stored on the ROM 102, and computes a target value of a control current to be supplied to the solenoid valves 51 and 52 on the basis of operation signals of the actuators (the boom cylinder 11*a* and the arm cylinder 12*a*). The control valve command generating section C11 refers to a table T11*b* stored on the ROM 102, and computes a target value of a control current to be supplied to the solenoid valves 61 and 62 on the basis of operation signals of the actuators (the boom cylinder 11*a* and the arm cylinder 12*a*).

The control valve command generating section C11 generates a control valve command for performing control such that the control current to be supplied to the solenoid valves 51, 52, 61, 62 becomes the target value, and outputs the generated control valve command to the current control section (not depicted). The current control section performs control such that the control current to be supplied to the solenoids of the solenoid valves 51, 52, 61, 62 becomes the target value on the basis of the control valve command.

Figure 13:
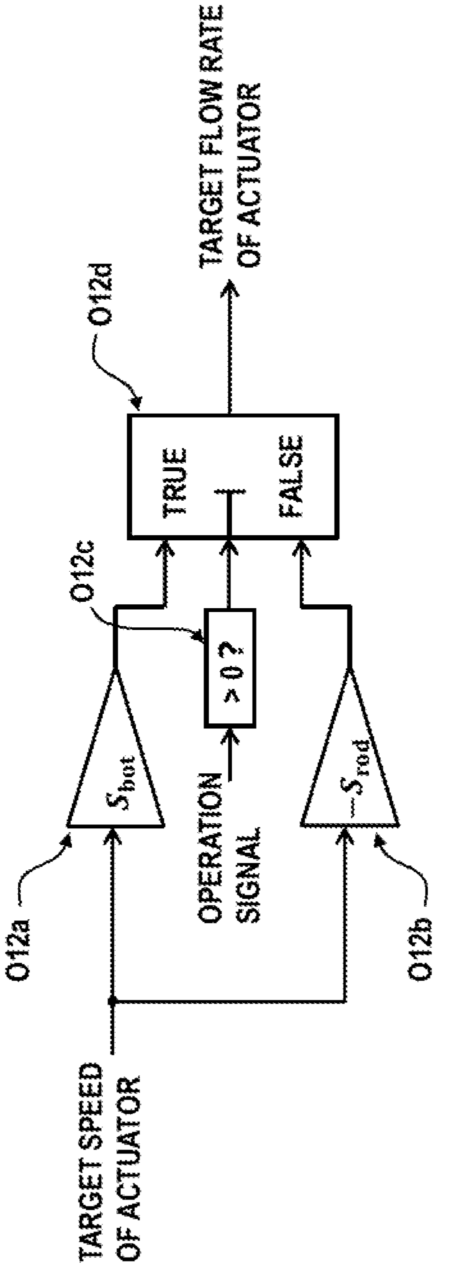
FIG. 13 is a figure depicting the processing content of a computation performed by an actuator target flow rate computing section.

FIG. 13 is a figure depicting the processing content of a computation performed by the actuator target flow rate computing section C12. The actuator target flow rate computing section C12 computes a target flow rate of an actuator on the basis of information (a target speed and an operation signal) corresponding to each actuator. The following explains a representative example in which a target flow rate of the boom cylinder 11*a* is computed on the basis of a target speed and an operation signal of the boom cylinder 11*a*.

As depicted in FIG. 13, the actuator target flow rate computing section C12 functions as multiplying sections O12*a* and O12*b*, an assessing section O12*c*, and a selecting section O12*d*.

The multiplying section O12*a* multiplies, by (Sbot), a target speed (positive value) of the boom cylinder 11*a* computed at the actuator target speed computing section C4 to compute a bottom-side inflow target flow rate. Here, Sbot is a pressure receiving area of the bottom side of the boom cylinder 11*a* (a pressure receiving area of two cylinders). The multiplying section O12*b* multiplies, by (−Srod), a target speed (negative value) of the boom cylinder 11*a* computed at the actuator target speed computing section C4 to compute a rod-side inflow target flow rate. Here, Srod is a pressure receiving area Srod of the rod side of the boom cylinder 11*a* (a pressure receiving area of two cylinders).

The assessing section O12*c* assesses whether or not the boom operation amount is a positive value on the basis of an operation signal of the boom cylinder 11*a*. If the assessing section O12*c* assesses that the boom operation amount is a positive value, the selecting section O12*d* determines the bottom-side inflow target flow rate as the target flow rate of the boom cylinder 11*a*. If the assessing section O12*c* assesses that the boom operation amount is not a positive value, the selecting section O12*d* determines the rod-side inflow target flow rate as the target flow rate of the boom cylinder 11*a*.

Note that the actuator target flow rate computing section C12 computes respective target flow rates on the basis of an operation signal and a target speed of the arm cylinder 12*a*, an operation signal and a target speed of the bucket cylinder 13*a*, an operation signal and a target speed of the travel hydraulic motor 2*a*, and an operation signal and a target speed of the swing hydraulic motor 3*a*.

Figure 14:
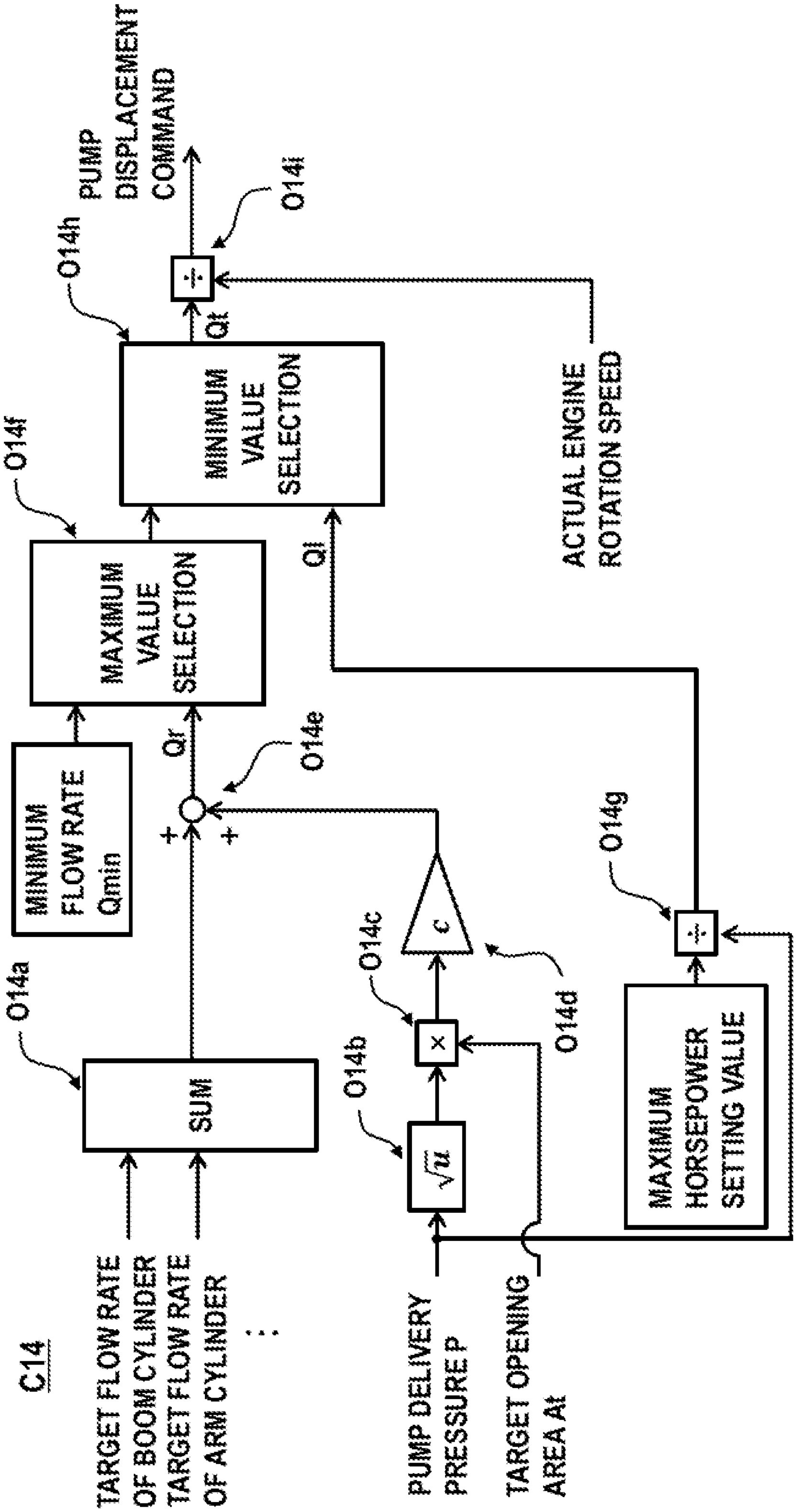
FIG. 14 is a figure depicting the processing content of a computation performed by a pump displacement command generating section.

FIG. 14 is a figure depicting the processing content of a computation performed by the pump displacement command generating section C14. As depicted in FIG. 14, the pump displacement command generating section C14 generates a pump displacement command to be output to the regulator 81*a* that controls the delivery capacity of the pump 81. The pump displacement command generating section C14 functions as an integrating section O14*a*, a computing section O14*b*, multiplying sections O14*c* and O14*d*, an adding section O14*e*, a maximum-value selecting section O14*f*, a dividing section O14*g*, a minimum-value selecting section O14*h*, and a dividing section O14*i*.

The integrating section O14*a* integrates target flow rates of the respective actuators (the boom cylinder 11*a*, the arm cylinder 12*a*, etc.) computed at the actuator target flow rate computing section C12, and calculates a total target flow rate. The computing section O14*b* calculates the square root of the pump delivery pressure P sensed at the pressure sensor 25. The multiplying section O14*c* multiplies the computation result (the square root of the pump delivery pressure P) of the computing section O14*b* by the target opening area At of the bleed-off valve 140 computed at the bleed-off valve command generating section C10. The multiplying section O14*d* multiplies the computation result of the multiplying section O14*c* by a flow rate coefficient c stored on the ROM 102, and calculates a bleed-off flow rate (a flow rate of the hydraulic working fluid passing through the bleed-off valve 140). The adding section O14*e* adds the bleed-off flow rate, which is the computation result of the multiplying section O14*d*, to the total target flow rate, which is the computation result of the integrating section O14*a*, to compute a pump demanded flow rate Qr.

The maximum-value selecting section O14*f* compares the pump demanded flow rate Or, which is the computation result of the adding section O14*e*, and a minimum flow rate Qmin with each other, and selects the greater one. Note that the minimum flow rate Qmin is a flow rate (an equipment protection setting value) set for preventing damage to the pump 81, and is stored on the ROM 102 in advance.

The dividing section O14*g* divides the maximum horsepower setting value by the pump delivery pressure P to compute a pump flow rate limit value Q1 according to a horsepower limit. The minimum-value selecting section O14*h* compares the flow rate (Qr or Qmin) selected at the maximum-value selecting section O14*f* with the pump flow rate limit value Q1, which is the computation result of the dividing section O14*g*, selects the smaller one, and determines the selected flow rate as the pump target flow rate Qt.

The dividing section O14*i* divides the pump target flow rate Qt, which is the computation result of the minimum-value selecting section O14*h*, by an actual engine rotation speed sensed at the engine rotation speed sensor 80*a* to compute a target value of the delivery capacity (displacement volume). The dividing section O14*i* generates a pump displacement command for performing control such that the delivery capacity of the pump 81 becomes the target value, and outputs the generated pump displacement command to the regulator 81*a*.

Figure 15:
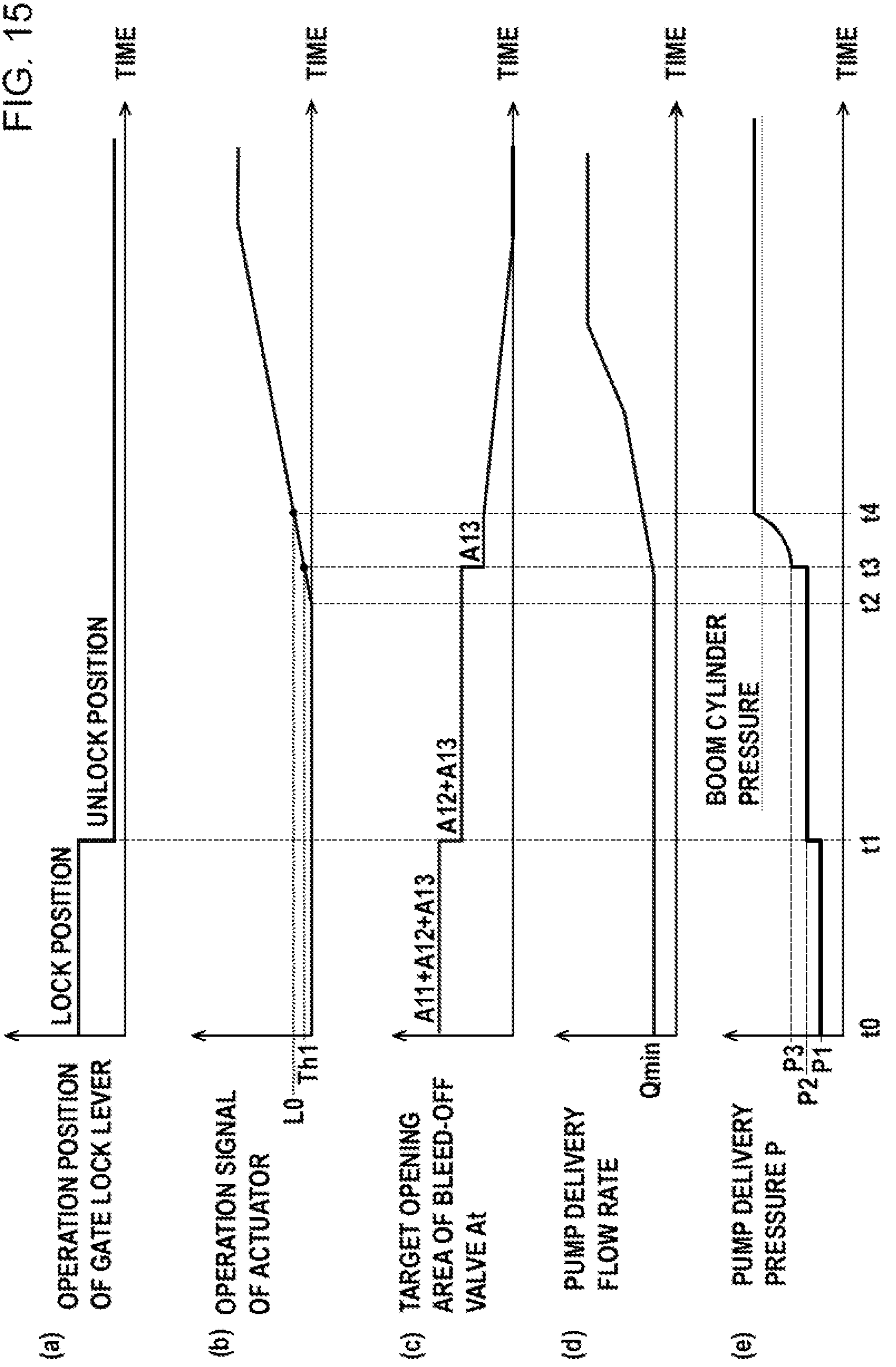
FIG. 15 is a time chart depicting changes in a target opening area At of the bleed-off valve set in accordance with operation of a gate lock lever device and actuator operation levers, in a delivery flow rate of a pump (pump target flow rate Qt) set in accordance with operation of the actuator operation levers, and in a delivery pressure P sensed at a pressure sensor.

Next, actions of the hydraulic excavator 1 according to the present embodiment are explained with reference to FIG. 15. FIG. 15 is a time chart depicting changes in the target opening area At of the bleed-off valve 140 set in accordance with operation of the gate lock lever device 22 and the actuator operation levers, the delivery flow rate (pump target flow rate Qt) of the pump 81 set in accordance with operation of the actuator operation levers, and the delivery pressure P sensed at the pressure sensor 25.

The horizontal axis of FIG. 15 represents time (times). The vertical axis of FIG. 15(*a*) represents the operation position of the gate lock lever device 22, the vertical axis of FIG. 15(*b*) represents actuator operation signals (the operation amount of the operation lever), the vertical axis of FIG. 15(*c*) represents the target opening area At of the bleed-off valve 140 set by the main controller 100, the vertical axis of FIG. 15(*d*) represents the delivery flow rate (pump target flow rate Qt) of the pump 81 set by the main controller 100, and FIG. 15(*e*) represents the pump delivery pressure P sensed at the pressure sensor 25.

At a time point to, the gate lock lever device 22 is operated to the lock position. In addition, at the time point to, all of the actuator operation levers are at the neutral positions. That is, all the operation devices of the actuators are in unoperated states. Because of this, the main controller 100 sets the target opening area At of the bleed-off valve 140 to A11+A12+A13 (At=A11+A12+A13). In this case, the main controller 100 performs control such that a control current supplied to the solenoid of the solenoid valve 63 becomes the minimum value (e.g. a waiting current value). Thus, the pressure of the pilot pressure receiving section 149 of the bleed-off valve 140 becomes a pressure equivalent to the tank pressure, and the spool 141 is arranged at the neutral position depicted in FIG. 6(*a*). As a result, the restricting holes (191, 192, and 193) of the first restrictor 151 give a resistance to the passing hydraulic working fluid, and the pump delivery pressure P (the circuit pressure of the main circuit HC1) is maintained at the first target value P1 (e.g. 2 MPa). Note that since the actuator operation levers are not being operated, the pump delivery flow rate is the minimum flow rate Qmin.

At a time point t1, when the gate lock lever device 22 is operated to the unlock position from the lock position, the main controller 100 sets the target opening area At of the bleed-off valve 140 to A12+A13 (At=A12+A13). In this case, the main controller 100 increases the pilot secondary pressure acting on the pilot pressure receiving section 149 of the bleed-off valve 140 by increasing the control current supplied to the solenoid of the solenoid valve 63, and moves the spool 141 to the position depicted in FIG. 6(*b*). Thus, the restricting holes (192 and 193) of the first restrictor 151 give a resistance to the passing hydraulic working fluid, and the pump delivery pressure P rises by one level to the second target value P2 (e.g. 3 MPa). By causing the pump delivery pressure P to have risen to the second target value P2, it is possible to drive the spool 141 in a direction to reduce the opening area of the restrictor 150 of the bleed-off valve 140 promptly when operation by an operation lever is started.

At a time point t2, for example, the operation lever 23*a* of the boom operation device 23 is operated from the neutral position, and if the operation amount exceeds the threshold Th1 at a time point t3, the main controller 100 sets the target opening area At of the bleed-off valve 140 to A13 (At=A13). In this case, the main controller 100 increases the pilot secondary pressure acting on the pilot pressure receiving section 149 of the bleed-off valve 140 by increasing the control current value supplied to the solenoid of the solenoid valve 63, and moves the spool 141 to the position depicted in FIG. 6(*c*). Thus, the restricting hole (193) of the first restrictor 151 gives a resistance to the passing hydraulic working fluid, and the pump delivery pressure P rises by one more level to the third target value P3 (e.g. 4 MPa). By causing the pump delivery pressure P to have risen to the third target value P3, it is possible to enhance the responsiveness of the spool 141 of the bleed-off valve 140 in response to operation of an operation lever. In addition, in this state, there is a circuit pressure that can move the spools of the control valves 45 and 46 to the full strokes by operation of the operation levers 23*a* and 24*a*.

When the operation lever 23*a* is operated further, and the operation amount increases, the pump delivery flow rate increases, and the pump delivery pressure P increases. When the pump delivery pressure P becomes higher than the load pressure of the boom cylinder 11*a*, the check valve 41 is opened, the hydraulic fluid (hydraulic working fluid) delivered from the pump 81 is supplied to the boom cylinder 11*a*, and the boom 11 is driven.

When the operation amount of the operation lever 23*a* exceeds the predetermined value L0 at a time point t4, the main controller 100 sets the target opening area At of the bleed-off valve 140 to an operation demanded opening area computed on the basis of an operation signal (an opening area smaller than A13). Because of this, at and after the time point t4, the target opening area At of the bleed-off valve 140 decreases along with an increase in the operation amount of the operation lever 23*a*.

Since the target opening area At of the bleed-off valve 140 is set to A13 immediately after the check valve 41 is opened, part of the hydraulic working fluid delivered from the pump 81 can be released through the bleed-off valve 140 to the tank 19. Then, due to continuous decreases in the target opening area At of the bleed-off valve 140, the flow rate of the hydraulic working fluid supplied to the boom cylinder 11*a* increases continuously. This prevents occurrence of shocks due to a sudden increase in the flow rate of the hydraulic working fluid supplied to the boom cylinder 11*a*, and the boom cylinder 11*a* can be actuated smoothly.

Actions and advantages of the present embodiment are explained in comparison with a comparative example of the present embodiment. In the comparative example of the present embodiment, the first restrictor 151 is omitted, only the second restrictor 152 formed by cutout portions 144 is provided, and the circuit pressure is maintained at a predetermined pressure by using the pressure loss generated at the second restrictor 152 at the time of non-operation. In this comparative example, the opening area of the restrictor changes undesirably even with a slight movement of the position of the spool. Because of this, it is difficult to perform the adjustment of the circuit pressure precisely.

In contrast to this, in the present embodiment, the first restrictor 151 includes the plurality of restricting holes (191, 192, and 193), the second restrictor 152 includes the cutout portions 144, and the circuit pressure is maintained at a predetermined pressure by using the pressure loss generated at the first restrictor 151 at the time of non-operation. The plurality of restricting holes (191, 192, and 193) are provided while being spaced apart from each other in the axial direction. Because of this, as depicted in FIG. 7, it is possible to ensure the moving areas Ac1, Ac2, and Ac3 where the combined opening area A0 can be kept constant, as moving areas of the spool 141 in the axial direction.

Accordingly, when the circuit pressure is to be maintained at the predetermined pressure P1, P2, or P3, by positioning the spool 141 in the range of the moving area Ac1, Ac2, or Ac3, it is possible to prevent the combined opening area A0 from changing undesirably in a case where the position of the spool 141 has shifted in the axial direction undesirably due to the influence of a disturbance such as a vibration or a temperature change of the hydraulic working fluid. That is, since the adjustment of the circuit pressure can be performed precisely according to the present embodiment as compared to the comparative example, it is possible to stably ensure a circuit pressure necessary for generation of the pilot primary pressure.

The following actions and effects can be attained by the embodiment mentioned above.

(1) The hydraulic excavator (work machine) 1 includes: the main circuit HC1 that supplies the working fluid delivered from the pump 81 to the actuators; the control valves 45 and 46 that are provided in the main circuit HC1, and that control flows of the working fluid supplied from the pump 81 to the actuators; the pilot circuit HC2 that introduces part of the working fluid delivered from the pump 81 to the pilot pressure receiving sections 45*a*, 45*b*, 46*a*, and 46*b* of the control valve 45; the pilot pressure reducing valve (first pressure reducing valve) 71 that is provided in the pilot circuit HC2, and reduces the pressure of the working fluid delivered from the pump 81 to generate the pilot primary pressure; the solenoid valves (second pressure reducing valves) 51, 61, 52, and 62 that are provided in the pilot circuit HC2, and reduce the pilot primary pressure to generate the pilot secondary pressure acting on the pilot pressure receiving sections 45*a*, 45*b*, 46*a*, and 46*b* of the control valves 45 and 46; the bleed-off passage Lb that connects the pump 81 and the tank 19; the pilot-driven bleed-off valve 140 provided on the bleed-off passage Lb; the solenoid valve (third pressure reducing valve) 63 that is provided in the pilot circuit HC2, and reduces the pilot primary pressure to generate the pilot secondary pressure acting on the pilot pressure receiving section 149 of the bleed-off valve 140; the operation devices 23 and 24 for operating the actuators; and the main controller (controller) 100 that controls the solenoid valve (third pressure reducing valve) 63) on the basis of operation by the operation devices 23 and 24.

The bleed-off valve 140 has: the spool 141 that is moved in the axial direction by the pilot secondary pressure generated by the solenoid valve (third pressure reducing valve) 63; the valve body 161 that houses the spool 141 slidably; and the restrictor 150 that gives a resistance to the passing working fluid. The moving area of the spool 141 in the axial direction has: the first moving area where the opening area (opening) of the restrictor 150 changes stepwise; and the second moving area where the opening area (opening) of the restrictor 150 changes continuously. When the actuators are not being operated by the operation devices 23 and 24, the main controller 100 controls the solenoid valve (third pressure reducing valve) 63 such that the spool 141 is positioned in the first moving area. When the actuators are being operated by the operation devices 23 and 24 with an operation amount greater than the predetermined value L0 set in advance, the main controller 100 controls the solenoid valve (third pressure reducing valve) 63 such that the spool 141 is positioned in the second moving area. The restrictor 150 has the restricting holes (the first inlet hole 191, the second inlet hole 192, and the third inlet hole 193) that give a resistance to the passing working fluid when the spool 141 is positioned in the first moving area.

According to this configuration, since the working fluid passes through the restricting holes (the first inlet hole 191, the second inlet hole 192, and the third inlet hole 193) when the actuators are not being operated, a pressure loss is generated, and accordingly it is possible to stably ensure a circuit pressure necessary for generation of the pilot primary pressure.

(2) The valve body 161 has: the sliding hole 170 that houses the spool 141 slidably; the supply passage 171 that communicates with the sliding hole 170, and receives a supply of the working fluid delivered from the pump 81; the discharge passage 172 that establishes communication between the sliding hole 170 and the tank 19; and the fluid chamber 197 provided in the sliding hole 170 such that the fluid chamber 197 is adjacent to the discharge passage 172. The spool 141 has: the first land portion (land portion) 181 that establishes or interrupts communication between the discharge passage 172 and the fluid chamber 197; the internal passage 146; the plurality of restricting holes (the first inlet hole 191, the second inlet hole 192, and the third inlet hole 193) that establish communication between the supply passage 171 and the internal passage 146; and the outlet holes (communication holes) 196 that establish communication between the internal passage 146 and the fluid chamber 197. The restrictor 150 of the bleed-off valve 140 includes: the first restrictor 151 including the plurality of restricting holes (the first inlet hole 191, the second inlet hole 192, and the third inlet hole 193); and the second restrictor 152 formed by the clearance between the cutout portions 144 formed at the first land portion 181 and the sliding hole 170.

That is, the first restrictor 151 is formed such that its opening area decreases stepwise as the spool 141 moves from the first end side toward the second end side of the sliding hole 170. The second restrictor 152 is formed such that its opening area decreases continuously as the spool 141 moves from the first end side toward the second end side of the sliding hole 170. According to this configuration, the circuit pressure can be changed stepwise by changing the opening area of the first restrictor 151 stepwise. In addition, since the bleed-off flow rate can be changed continuously by changing the opening area of the second restrictor 152 continuously, the actuators can be actuated smoothly.

(3) The first restrictor 151 includes: the restricting holes (the first inlet hole 191 and the second inlet hole 192) that establish communication between the supply passage 171 and the internal passage 146 when the spool 141 is positioned on the first end side of the sliding hole 170, and interrupts communication between the supply passage 171 and the internal passage 146 when the spool 141 is positioned on the second end side of the sliding hole 170; and the restricting hole (the third inlet hole 193) that establishes communication between the supply passage 171 and the internal passage 146 independently of the position of the spool 141.

In the present embodiment, the two restricting holes (the first inlet hole 191 and the second inlet hole 192) that make a transition from the communicating state to the interrupting state are provided. Because of this, by switching only the first inlet hole 191 to the interrupting state when the pump delivery flow rate is a predetermined value (e.g. the minimum flow rate), the pump delivery pressure P can be caused to rise by one level from the first target value P1 to the second target value P2, and by switching both the first inlet hole 191 and the second inlet hole 192 to the interrupting state, the pump delivery pressure P can be caused to rise by one more level from the second target value P2 to the third target value P3. In this configuration, the circuit pressure can be changed stepwise to the three pressure states. Because of this, by adjusting the circuit pressure stepwise according to the state of the hydraulic excavator 1, it is possible to improve the energy consumption efficiency, to adjust the responsiveness and movable ranges of actions of the spool 141 of the bleed-off valve 140 and the spools of the control valves 45 and 46, and so on.

(4) The hydraulic excavator 1 includes the gate lock lever device (lock lever device) 22 that is selectively operated to the lock position for prohibiting actions of the actuators (11*a* and 12*a*), and to the unlock position for permitting actions of the actuators (11*a* and 12*a*). Where the gate lock lever device 22 is operated to the lock position, the main controller 100 controls the position of the spool 141 such that the opening area of the restrictor 150 becomes the maximum opening area Amax (=A11+A12+A13). When the actuators (11*a* and 12*a*) are not being operated by the operation devices 23 and 24 in a case where the gate lock lever device 22 is operated to the unlock position, the main controller 100 controls the position of the spool 141 such that the opening area of the restrictor 150 becomes the opening area (A12+A13) which is one level smaller than the maximum opening area Amax. When the actuators (11*a* and 12*a*) are being operated by the operation devices 23 and 24 with an operation amount which is equal to or smaller than the predetermined value L0 set in advance in a case where the gate lock lever device 22 is operated to the unlock position, the main controller 100 controls the position of the spool 141 such that the opening area of the restrictor 150 becomes the opening area (A13) which is two levels smaller than the maximum opening area Amax.

In this configuration, since, when the gate lock lever device 22 is operated to the lock position, the opening area of the restrictor 150 becomes the maximum opening area Amax, the energy consumption efficiency can be enhanced most. When the gate lock lever device 22 is operated to the unlock position, the pump delivery pressure P rises by one level, and it is possible to ensure a circuit pressure necessary for generation of a pilot pressure necessary for driving the control valves 45 and 46, and also enhance the energy consumption efficiency to some extent. When operation is performed by the operation devices 23 and 24 with an operation amount which is equal to or smaller than the predetermined value L0 in a state where the gate lock lever device 22 is operated to the unlock position (i.e. the operation amount>the threshold Th1), the pump delivery pressure P rises by one more level, and accordingly it becomes possible to actuate the control valves 45 and 46 to the full strokes in accordance with the operation.

(5) The restricting holes (the first inlet hole 191, the second inlet hole 192, and the third inlet hole 193) are through holes penetrating the spool 141 in the radial direction, and are formed such that their radial-direction length L2 is shorter than the axial-direction length L1 of the cutout portions 144. If the radial length L2 of the restricting holes is too long, a change in the pressure loss caused by the temperature change (viscosity change) of the working fluid increases undesirably. For example, where the temperature of the working fluid is low, and the viscosity is high, there is a fear that the pressure loss increases, and the circuit pressure becomes excessive undesirably. In addition, where the temperature of the working fluid is high, and the viscosity is low, there is a fear that the pressure loss decreases, and it becomes impossible to ensure a necessary circuit pressure undesirably. In the present embodiment, since the radial-direction length L2 of the restricting holes (the first inlet hole 191, the second inlet hole 192, and the third inlet hole 193) is shorter than the axial-direction length L1 of the cutout portions 144, the influence of temperature change of the working fluid (viscosity change) can be reduced. Because of this, it is possible to prevent the circuit pressure from becoming excessive when the temperature of the working fluid is low, and prevent the circuit pressure from becoming inadequate when the temperature of the working fluid is high.

Modification examples like the ones mentioned below are also included in the scope of the present invention, and it is also possible to combine configuration depicted in the modification examples and the configuration explained in the embodiment mentioned above, combine configurations explained in different modification examples below, and so on.

Modification Example 1

The configuration of the bleed-off valve 140 is not limited to the configuration explained in the embodiment described above. Whereas the two adjustment holes (the first inlet hole 191 and the second inlet hole 192) that make a transition from the communicating state to the interrupting state are provided in the example explained in the embodiment, three or more adjustment holes that are spaced apart from each other in the axial direction may be provided to the spool. In addition, one of the two adjustment holes may be omitted. For example, the first inlet hole (adjustment hole) 191 may be formed such that its opening area is A11+A12, and the second inlet hole (adjustment hole) 192 may be omitted.

Modification Example 1-1

A method of setting a target opening area in a case where there is one adjustment hole that makes a transition from the communicating state to the interrupting state is explained. The main controller 100 according to the present modification example 1-1 sets the target opening area At of the bleed-off valve 140 to A11+A12+A13 independently of the operation position of the gate lock lever device 22. In addition, the main controller 100 according to the present modification example 1-1 sets the target opening area At of the bleed-off valve 140 to A13 when the operation amount of the actuator operation levers exceeds the threshold Th1.

According to this configuration, since the opening area of the restrictor 150 of the bleed-off valve 140 is the maximum opening area Amax (=A11+A12+A13) when the actuators are not being operated, the energy consumption can be reduced similarly to the embodiment described above. Note that, in the present modification example 1-1, when the operation amount of the actuator operation levers increases and exceeds the threshold Th1, the target opening area At of the bleed-off valve 140 is set to A13. Because of this, the responsiveness of actions of the spool 141 of the bleed-off valve 140 and the spools of the control valves 45 and 46 according to operation of the operation devices 23 and 24 is high in the embodiment described above as compared to the present modification example.

Modification Example 1-2

Another method of setting a target opening area in a case where there is one adjustment hole that makes a transition from the communicating state to the interrupting state is explained. The main controller 100 according to the present modification example 1-2 sets the target opening area At of the bleed-off valve 140 to A11+A12+A13 in a case where the operation position of the gate lock lever device 22 is operated to the lock position. In addition, the main controller 100 according to the present modification example 1-2 sets the target opening area At of the bleed-off valve 140 to A13 in a case where the operation position of the gate lock lever device 22 is operated to the unlock position.

According to this configuration, since the opening area of the restrictor 150 of the bleed-off valve 140 is the maximum opening area Amax (=A11+A12+A13) when the actuators are not being operated, the energy consumption can be reduced similarly to the embodiment described above. Note that, in the present modification example 1-2, the target opening area At of the bleed-off valve 140 is set to A13 when the gate lock lever device 22 is operated to the unlock position. Because of this, the energy consumption efficiency is high in the embodiment described above as compared to the present modification example.

Modification Example 2

Figure 16:
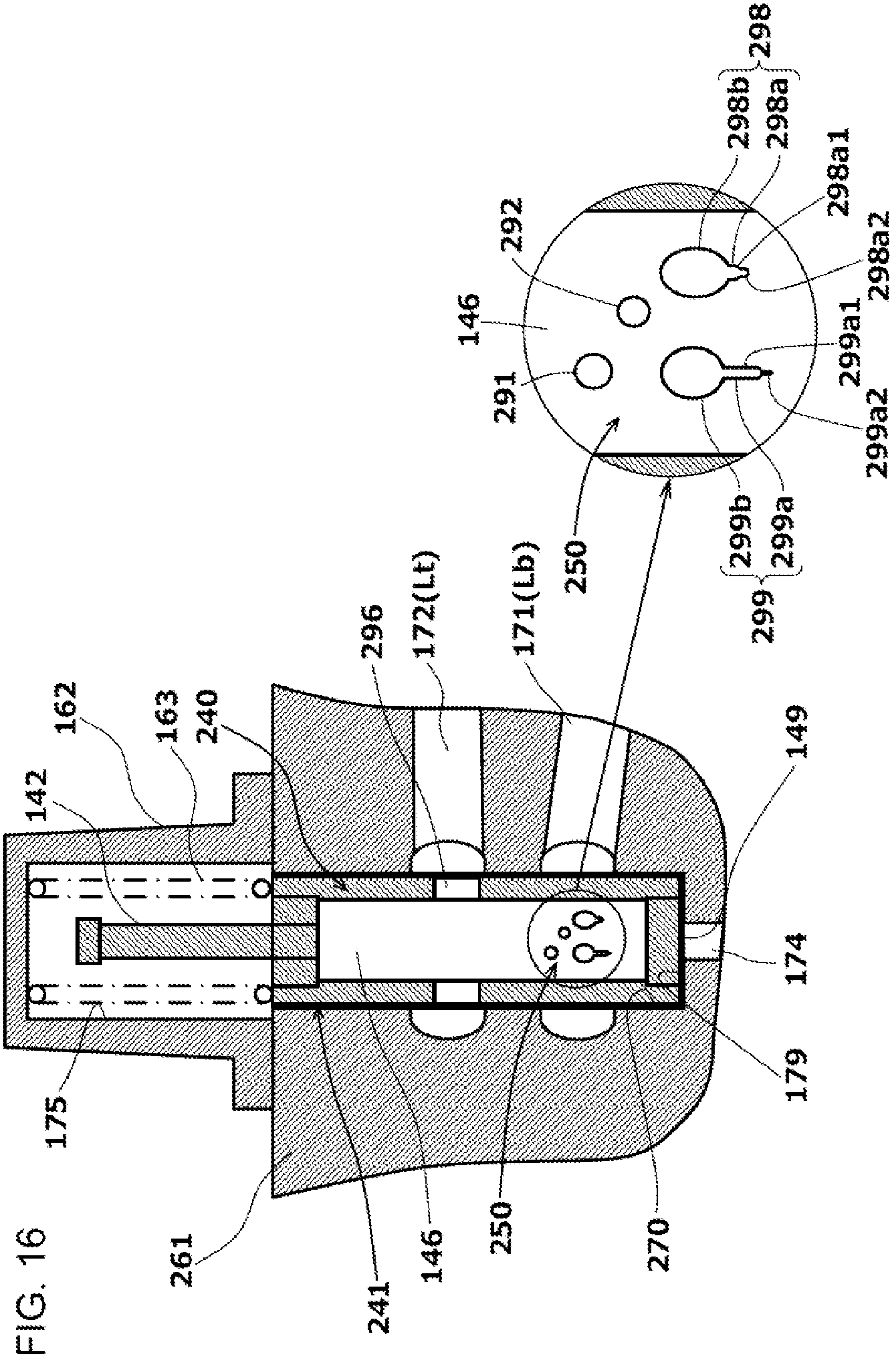
FIG. 16 is a cross-sectional schematic diagram of the bleed-off valve according to a modification example 2.

A modification example 2 of the embodiment described above is explained with reference to FIG. 16. FIG. 16 is a figure similar to FIG. 3, and is a cross-sectional schematic diagram of a bleed-off valve 240 according to the modification example 2. The following mainly explains differences from the bleed-off valve 140 explained with reference to the embodiment described above. As depicted in FIG. 16, the annular groove 183 (see FIG. 3) is not formed in a spool 241 in the present modification example. In addition, the annular recess portion 173 (see FIG. 3) is not formed in a sliding hole 270. Furthermore, the cutout portions 144 (see FIG. 3) explained with reference to the embodiment described above also are not formed in the bleed-off valve 240 according to the present modification example. The following mainly explains differences from the embodiment described above regarding the structure of the bleed-off valve 240 according to the present modification example.

A valve body 261 has: the sliding hole 270 that houses the spool 241 slidably; the supply passage 171 that communicates with the sliding hole 270, and receives a supply of the hydraulic working fluid delivered from the pump 81; and the discharge passage 172 that establishes communication between the sliding hole 270 and the tank 19.

The spool 241 has: the internal passage 146; a plurality of restricting holes (an inlet hole 291, an inlet hole 292, an inlet hole 298, and an inlet hole 299) that establish communication between the supply passage 171 and the internal passage 146; and a plurality of outlet holes 296 that establish communication between the internal passage 146 and the discharge passage 172. Note that the total opening area of the plurality of outlet holes 296 is sufficiently greater than the total opening area of the plurality of restricting holes (291, 292, 298, and 299).

A restrictor 250 of the bleed-off valve 240 according to the present modification example includes the plurality of restricting holes (291, 292, 298, and 299). The inlet holes 291 and 292 are restricting holes with a circular cross-sectional shape that are provided while being spaced apart from each other in the axial direction, and are formed such that the opening area (opening) of the restrictor 250 decreases stepwise as the spool 241 moves from the first end side toward the second end side of the sliding hole 270. When the inlet hole 291 switches from the communicating state to the interrupting state, the opening area of the restrictor 250 changes to an opening area which is one level smaller from the maximum opening area. In addition, when the inlet hole 292 switches from the communicating state to the interrupting state, the opening area of the restrictor 250 changes to an opening area which is one more level smaller.

The inlet holes 298 and 299 are restricting holes that are formed such that the opening area (opening) of the restrictor 250 decreases continuously as the spool 241 moves from the first end side toward the second end side of the sliding hole 270. The inlet hole 298 and the inlet hole 299 are provided while being spaced apart from each other in the circumferential direction.

The inlet hole 298 has: a base hole portion 298*b* with an oval shape whose longitudinal axis is arranged along the axial direction; and a cutout portion 298*a* that is formed to extend in the axial direction from a first end (the lower end in the figure) of the base hole portion 298*b* toward the lower end of the spool 241. The cutout portion 298*a* has: a base end side cutout portion 298*a*1 that is formed continuously from the base hole portion 298*b*; and a distal end side cutout portion 298*a*2 that extends downward direction from the base end side cutout portion 298*a*1. The width of the distal end side cutout portion 298*a*2 is shorter than the width of the base end side cutout portion 298*a*1. The base hole portion 298*b* and the cutout portion 298*a* penetrate the spool 241 in the radial direction.

Similarly, the inlet hole 299 has: a base hole portion 299*b* with an oval shape whose longitudinal axis is arranged along the axial direction; and a cutout portion 299*a* that is formed to extend in the axial direction from a first end (the lower end in the figure) of the base hole portion 299*b* toward the lower end of the spool 241. The cutout portion 299*a* has: a base end side cutout portion 299*a*1 that is formed continuously from the base hole portion 299*b*; and a distal end side cutout portion 299*a*2 that extends downward direction from the base end side cutout portion 299*a*1. The width of the distal end side cutout portion 299*a*2 is shorter than the width of the base end side cutout portion 299*a*1. The base hole portion 299*b* and the cutout portion 299*a* penetrate the spool 241 in the radial direction.

The main controller 100 positions the spool 241 at the neutral position where all of the plurality of inlet holes (291, 292, 298, and 299) are in the fully-opened states, when the gate lock lever device 22 is operated to the lock position. Thus, since the opening area of the restrictor 250 becomes the maximum opening area Amax, the circuit pressure is maintained at the first target value P1.

The main controller 100 positions the spool 241 at such a position where only the inlet hole 291 in the plurality of inlet holes (291, 292, 298, and 299) is in the fully-closed state, when the actuators are not being operated in a case where the gate lock lever device 22 is operated to the unlock position. Thus, the opening area of the restrictor 250 becomes an opening area which is one level smaller than the maximum opening area Amax, and the circuit pressure is maintained at the second target value P2 which is one level higher than the first target value P1.

The main controller 100 positions the spool 241 at such a position where the inlet holes 291 and 292 are in the fully-closed states, and the inlet holes 298 and 299 are in the fully-opened states, when the actuators are being operated with an operation amount which is equal to or smaller than the predetermined value L0 set in advance in a case where the gate lock lever device 22 is operated to the unlock position. Thus, the opening area of the restrictor 250 becomes an opening area which is two levels smaller than the maximum opening area Amax.

When the operation amounts of the operation levers 23*a* and 24*a* become greater than the predetermined value L0, the opening areas of the inlet holes 291 and 292 decrease as the operation amounts increase. At this time, the opening areas of the base hole portions 298*b* and 299*b* with flow channel cross-sectional areas greater than the cutout portions 298*a* and 299*a* decrease, and thereafter the opening areas of the cutout portions 298*a* and 299*a* decrease. Accordingly, as the operation amounts of the operation levers 23*a* and 24*a* increase, the absolute value of the rate of changes in the opening areas relative to the operation amounts decreases. Because of this, as compared with a case where the rate of changes in the opening areas relative to the operation amounts is constant, the actuators can be actuated more smoothly.

According to such a modification example, in addition to actions and advantages similar to those of the embodiment described above, the axial-direction length of the spool 241 can be shortened by omitting the fluid chamber 197. That is, the size reduction of the control valve block 4 makes it possible to reduce the product cost.

Modification Example 3

In the embodiment described above, when the actuators are not being operated in a case where the gate lock lever device 22 is operated to the unlock position, the main controller 100 sets the target opening area At of the restrictor 150 to A11+A12, and, when the gate lock lever device 22 is operated to the lock position in that state, sets the target opening area At of the restrictor 150 to A11+A12+A13. In contrast to this, for example, the main controller 100 may set the target opening area At of the restrictor 150 to A11+A12+A13 when the actuators have not been operated for a predetermined length of time set in advance in a state where the target opening area At of the restrictor 150 has been set to A11+A12.

Modification Example 4

Whereas the radial-direction length L2 of the restricting holes (the first inlet hole 191, the second inlet hole 192 and the third inlet hole 193) is formed shorter than the axial-direction length L1 of the cutout portions 144 in the example explained in the embodiment, the present invention is not limited to this. For example, in the hydraulic excavator 1 that performs work in a work environment with smaller temperature changes, the radial-direction length L2 of the restricting holes may be formed the same as or longer than the axial-direction length L1 of the cutout portions 144.

Modification Example 5

Figure 17:
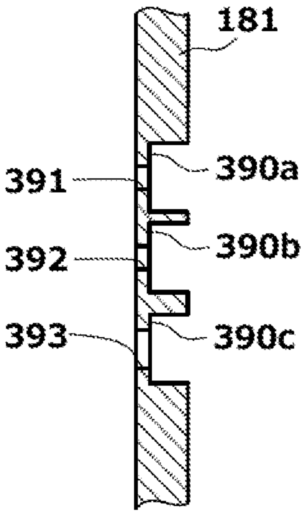
FIG. 17 is a cross-sectional schematic diagram depicting an enlarged view of part of the first land portion in the bleed-off valve according to a modification example 5, and depicts the first inlet hole, the second inlet hole, and the third inlet hole.

As depicted in FIG. 17, grooves 390*a*, 390*b*, and 390*c* with predetermined lengths may be formed along the circumferential direction of the first land portion 181, and restricting holes 391, 392, and 393 with diameters smaller than the axial-direction widths of the grooves 390*a*, 390*b*, and 390*c* may be provided to the bottoms of the grooves 390*a*, 390*b*, and 390*c*. Thus, by shortening the flow channel lengths (radial lengths) of the restricting holes 391, 392, and 393 while improving the strength of the spool 141, the influence of the viscosity of the hydraulic working fluid can be reduced.

Modification Example 6

Whereas the cross-sectional shape of the restricting holes (the first inlet hole 191, the second inlet hole 192, and the third inlet hole 193) is circular in the example explained in the embodiment, the present invention is not limited to this. The cross-sectional shape of the restricting holes can be various shapes such as an oval shape, elliptical shape, and polygonal shape.

Modification Example 7

Whereas the work machine is a crawler type hydraulic excavator 1 in the case explained as an example in the embodiment, the present invention is not limited to this. The present invention can be applied to various work machines such as a wheel type hydraulic excavator, a wheel loader, and a crawler crane.

Whereas an embodiment of the present invention has been explained thus far, the embodiment described above is depicted merely as some of application examples of the present invention, and it is not aimed to limit the technical scope of the present invention to the specific configuration of the embodiment described above.

DESCRIPTION OF REFERENCE CHARACTERS

1: Hydraulic excavator (work machine)
2*a*: Travel hydraulic motor (actuator)
3*a*: Swing hydraulic motor (actuator)
10: Work implement
11*a*: Boom cylinder (actuator)
12*a*: Arm cylinder (actuator)
13*a*: Bucket cylinder (actuator)
20: Machine body
22: Gate lock lever device (lock lever device)
23, 24: Operation device
45, 46: Control valve
51, 52, 61, 62: Solenoid valve (second pressure reducing valve)
63: Solenoid valve (third pressure reducing valve)
71: Pilot pressure reducing valve (first pressure reducing valve)
74: Lock valve (solenoid selector valve)
80: Engine
81: Pump
100: Main controller (controller)
140, 240: Bleed-off valve
141, 241: Spool
144: Cutout portion
146: Internal passage
149: Pilot pressure receiving section
161, 261: Valve body
170, 270: Sliding hole
171: Supply passage
172: Discharge passage
173: Annular recess portion
174: Pilot passage
175: Spring chamber
181: First land portion (land portion)
191, 391: First inlet hole (restricting hole)
192, 392: Second inlet hole (restricting hole)
193, 393: Third inlet hole (restricting hole)
194: Flow channel cross section
196: Outlet hole (communication hole)
197: Fluid chamber
291: Inlet hole (restricting hole)
292: Inlet hole (restricting hole)
296: Outlet hole
298, 299: Inlet hole (restricting hole)
298*a*, 299*a*: Cutout portion
298*b*, 299*b*: Base hole portion
A0: Combined opening area (opening area of restrictors)
HC1: Main circuit
HC2: Pilot circuit
L0: Predetermined value
Lb: Bleed-off passage Ld: Pump delivery passage
Lp: Parallel passage
Lt: Tank passage
P: Pump delivery pressure (circuit pressure of main circuit)
Th1: Threshold

The invention claimed is:

1. A work machine comprising:

a main circuit that supplies a working fluid delivered from a pump to an actuator;

a control valve that is provided in the main circuit, and controls a flow of the working fluid supplied from the pump to the actuator;

a pilot circuit that introduces part of the working fluid delivered from the pump to a pilot pressure receiving section of the control valve;

a first pressure reducing valve that is provided in the pilot circuit, and reduces a pressure of the working fluid delivered from the pump to generate a pilot primary pressure;

a second pressure reducing valve that is provided in the pilot circuit, and reduces the pilot primary pressure to generate a first pilot secondary pressure acting on the pilot pressure receiving section of the control valve;

a bleed-off passage that connects the pump and a tank;

a pilot-driven bleed-off valve provided on the bleed-off passage;

a third pressure reducing valve that is provided in the pilot circuit, and reduces the pilot primary pressure to generate a second pilot secondary pressure acting on a pilot pressure receiving section of the bleed-off valve;

an operation lever that operates the actuator; and a controller that controls the third pressure reducing valve on a basis of operation by the operation lever, wherein the bleed-off valve has:

a spool that is moved in an axial direction by the second pilot secondary pressure generated by the third pressure reducing valve;

a valve body that houses the spool slidably; and a restrictor that gives a resistance to the working fluid passing therethrough, a moving area of the spool in the axial direction has a first moving area where an opening area of the restrictor changes stepwise, and a second moving area where the opening area of the restrictor changes continuously, the controller is configured to control the third pressure reducing valve such that the spool is positioned in the first moving area in a case the actuator is not being operated by the operation lever, and control the third pressure reducing valve such that the spool is positioned in the second moving area in a case the actuator is being operated by the operation lever with an operation amount greater than a predetermined value set in advance, and the restrictor has a plurality of restricting holes that gives a resistance to the working fluid passing through in a case the spool is positioned in the first moving area.

2. The work machine according to claim 1, wherein the valve body has:

a sliding hole that houses the spool slidably;

a supply passage that communicates with the sliding hole, and receives a supply of the working fluid delivered from the pump;

a discharge passage that establishes communication between the sliding hole and the tank; and a fluid chamber provided in the sliding hole such that the fluid chamber is adjacent to the discharge passage, the spool has:

a land portion that establishes or interrupts communication between the discharge passage and the fluid chamber;

an internal passage;

the plurality of restricting holes that establish communication between the supply passage and the internal passage; and a communication hole that establishes communication between the internal passage and the fluid chamber, a cutout portion is formed at an axial end of the land portion, and the restrictor includes a first restrictor portion including the plurality of restricting holes, and a second restrictor portion formed by a clearance between the cutout portion formed at the land portion and the sliding hole.

3. The work machine according to claim 2, wherein the plurality of restricting holes includes:

a first restricting hole that establishes communication between the supply passage and the internal passage in a case the spool is positioned on a first end side of the sliding hole, and interrupts communication between the supply passage and the internal passage in a case the spool is positioned on a second end side of the sliding hole; and a second restricting hole that establishes communication between the supply passage and the internal passage independently of a position of the spool.

4. The work machine according to claim 2, wherein the plurality of restricting holes are through holes penetrating the spool in a radial direction, and are formed such that a radial-direction length of the through holes is shorter than an axial-direction length of the cutout portion.

5. The work machine according to claim 1, wherein the valve body has:

a sliding hole that houses the spool slidably;

a supply passage that communicates with the sliding hole, and receives a supply of the working fluid delivered from the pump; and a discharge passage that establishes communication between the sliding hole and the tank, the spool has:

an internal passage;

the plurality of restricting holes that establish communication between the supply passage and the internal passage; and an outlet hole that establishes communication between the internal passage and the discharge passage, and the plurality of restricting holes include restricting hole formed with a base hole portion and a cutout portion extending from an end of the base hole portion in the axial direction of the spool.

6. The work machine according to claim 1, further comprising:

a lock lever device that is operated selectively to a lock position prohibiting an action of the actuator and to an unlock position permitting an action of the actuator, wherein the controller is configured to control a position of the spool such that the opening area of the restrictor becomes a maximum opening area in a case where the lock lever device is operated to the lock position, control the position of the spool such that the opening area of the restrictor becomes a first opening area that is smaller than the maximum opening area in a case the actuator is not being operated by the operation lever in a case where the lock lever device is operated to the unlock position, and control the position of the spool such that the opening area of the restrictor becomes a second opening area that is smaller than the first opening area in a case the actuator is being operated by the operation lever with an operation amount that is equal to or smaller than the predetermined value in a case where the lock lever device is operated to the unlock position.

* * * * *